United States Patent
Silverman et al.

(10) Patent No.: US 12,435,892 B2
(45) Date of Patent: Oct. 7, 2025

(54) PROCESS AND SYSTEM FOR DRY MIST DISPENSER AND OZONE SANITIZER WITH AUTOMATIC WATER REPLENISHMENT

(71) Applicant: Humatador, LLC, Indian Harbour Beach, FL (US)

(72) Inventors: David Silverman, Indian Harbour Beach, FL (US); Robert Clegg Woodring, Palm Bay, FL (US)

(73) Assignee: Humatador, LLC, Indian Harbour Beach, FL (US)

( * ) Notice: Subject to any disclaimer, the term of this patent is extended or adjusted under 35 U.S.C. 154(b) by 605 days.

(21) Appl. No.: 17/722,615

(22) Filed: Apr. 18, 2022

(65) Prior Publication Data
US 2022/0364749 A1 Nov. 17, 2022

Related U.S. Application Data

(63) Continuation-in-part of application No. 17/320,957, filed on May 14, 2021, now Pat. No. 11,980,695.

(51) Int. Cl.
*F24F 8/26* (2021.01)
*F24F 6/14* (2006.01)
(Continued)

(52) U.S. Cl.
CPC ............ *F24F 11/0008* (2013.01); *F24F 6/14* (2013.01); *F24F 8/22* (2021.01); *F24F 8/26* (2021.01);
(Continued)

(58) Field of Classification Search
CPC ........... F24F 8/26; F24F 8/95; F24F 2006/006
See application file for complete search history.

(56) References Cited

U.S. PATENT DOCUMENTS

| 4,035,301 A | 7/1977 | Armstrong |
| 5,859,952 A * | 1/1999 | Levine ...................... F24F 6/18 239/102.1 |

(Continued)

FOREIGN PATENT DOCUMENTS

| DE | 20007336 U | 4/2010 |
| DE | 102017210854 A | 1/2019 |

(Continued)

OTHER PUBLICATIONS

International Search Report in related application PCT/US2021/032624 dated Sep. 15, 2021; 4 pages.
(Continued)

*Primary Examiner* — Jerry-Daryl Fletcher
*Assistant Examiner* — Daniel C Comings
(74) *Attorney, Agent, or Firm* — Mark Malek; Jonathan D. Staudt; Widerman Malek, PL

(57) ABSTRACT

A humidifying system having a housing one or more water filters in fluid communication with a water source, a water purifier in fluid communication with the water filters, and a water storage tank in fluid communication with the water purifier. The system further includes a water reservoir in fluid communication with the water purifier and the water storage tank, a sterilizer in communication with water carried by the water storage tank, and a dispensing line that extends to a position external to the housing. The system yet further includes a dry mist generator to generate a dry mist using water from the water storage tank, an ozone generator to generate ozone to be mixed with the dry mist and expelled from the housing via the dispensing line. The system further includes a system controller in communication with the sterilizer, the dry mist generator, and the ozone generator.

**30 Cla

(51) Int. Cl.
   *F24F 8/22*     (2021.01)
   *F24F 11/00*    (2018.01)
   *F24F 6/00*     (2006.01)
   *F24F 110/20*   (2018.01)

(52) U.S. Cl.
   CPC ... *F24F 2006/006* (2013.01); *F24F 2006/008* (2013.01); *F24F 2006/143* (2013.01); *F24F 2110/20* (2018.01)

(56) References Cited

U.S. PATENT DOCUMENTS

| | | | |
|---|---|---|---|
| 6,726,186 B2 | 4/2004 | Gaaloul et al. | |
| 8,414,839 B1 | 4/2013 | Barnes | |
| 2002/0185423 A1 | 12/2002 | Boyd et al. | |
| 2004/0070091 A1* | 4/2004 | Rotering | F24F 6/025 261/70 |
| 2008/0226495 A1* | 9/2008 | Sparks | A61L 2/22 422/128 |
| 2009/0208379 A1* | 8/2009 | Hou | F24F 6/12 261/24 |
| 2009/0263499 A1* | 10/2009 | Platt, Jr. | F24F 8/24 422/291 |
| 2011/0068489 A1* | 3/2011 | Terlson | F24F 11/30 261/106 |
| 2013/0199221 A1* | 8/2013 | Tudor | F25D 21/14 62/93 |
| 2016/0131372 A1* | 5/2016 | Choi | F24F 13/222 62/189 |
| 2018/0327264 A1* | 11/2018 | Sato | C01B 13/11 |
| 2019/0038794 A1 | 2/2019 | Reddy et al. | |
| 2019/0226704 A1* | 7/2019 | Lundgreen | F24F 11/30 |

FOREIGN PATENT DOCUMENTS

| | | |
|---|---|---|
| EP | 3108974 A1 | 12/2016 |
| WO | 2007012226 A1 | 2/2007 |
| WO | 2008069774 A2 | 6/2008 |

OTHER PUBLICATIONS

Written Opinion in related application PCT/US2021/032624 dated Sep. 15, 2021; 8 pages.
Written Opinion in application PCT/2021/032523 dated Aug. 13, 2021; 10 pages.
International Search Report in application PCT/2021/032523 dated Aug. 13, 2021; 4 pages.

* cited by examiner

PROCESS AND SYSTEM FOR DRY MIST DISPENSER AND OZONE SANITIZER WITH AUTOMATIC WATER REPLENISHMENT

RELATED APPLICATIONS

This application is a continuation-in-part application of and claims priority under 35 U.S.C. § 120 of U.S. patent application Ser. No. 17/320,957 filed on May 14, 2021 and titled PROCESS AND SYSTEM FOR ULTRASONIC DRY MIST DISPENSER AND OZONE SANITIZER, the entire contents of which are incorporated herein by reference, except to the extent that content therein conflicts with content herein.

FIELD OF THE INVENTION

This invention relates generally to sanitization, sterilization, disinfection, and humidification of surfaces and/or rooms and, more specifically, to a process and system for generating a dry mist saturated with dissolved ozone and dispensing the dry mist saturated with dissolved ozone on surfaces and/or into environments for sanitization and humidification purposes. Further, the invention relates to sanitization, sterilization, disinfection, and humidification of surfaces and objects, as well as airborne particles, including, but not limited to, free bacteria, viruses, and/or fungi.

BACKGROUND OF THE INVENTION

Due to the growing popularity of cigars, cigar shops, and therefore humidors there has come a growing demand for a humidifying, sanitization and/or disinfection process and system that can humidify, disinfect, and sanitize environments, surfaces, objects, and airborne particles in a fast and efficient manner to remove bacteria, viruses, fungi, and other pathogens while maintaining desired levels of humidity. Namely, in the environment of humidors given that they are typically maintained at higher levels of humidity which results in an environment that is favorable for pathogen and fungus growth.

Numerous processes and systems using liquid disinfectants that are typically sprayed onto surface areas and into ambient air are well known in the prior art, as are humidifying machines to maintain and/or create desired humidity levels. Prior art systems, however, may have deleterious effects on an individual or sensitive surfaces and objects such as cigars and cigar boxes, as liquid disinfectants can leave toxic chemicals on or absorbed in a surface or object, or create toxic vapors in the surrounding air. Thus, a humidifier in concert with liquid disinfectant may affect an exposed person causing various health disorders, and/or cause undesired contamination or destruction of the exposed surfaces or objects.

Some ozone generating machines rely on introducing ozone gas into ambient air. This is inadequate for quick and safe dispersion of ozone molecules for sanitization, disinfection, and health issues. Because ambient air ozone gas generating machines utilize ambient air to produce ozone, and the air can contain copious amounts of Nitrogen, it results in air surfaces that can include Nitric Oxides and Nitric acid.

In light of the above deficiencies in the prior art, a solution is needed that provides a system and process to humidify, treat, disinfect, sanitize, and sterilize environments, surfaces, and objects, as well as airborne particles, and that avoids introduction of harmful chemicals.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

The present invention addresses the deficiencies in the prior art by providing a humidifying system that sanitizes and humidifies and environment without using or leaving harmful chemicals in the environment or on surfaces or objects while maintaining the environment's humidity at desired levels.

With the above in mind, embodiments of the present invention are related to a humidifying system that may include a housing, one or more water filters, a water purifier, a water storage tank, a water quality sensor, one or more water level sensors, a dry mist generator, an ozone generator, and a system controller. The water filters, water purifier, water storage tank, and system controller may be carried by the housing. The water filters may be in fluid communication with a water source, the water purifier may be in fluid communication with the water filters, and the water storage tank may be in fluid communication with the water purifier.

The water level sensors may be configured to sense a water level within the water storage tank, and the water quality sensors that may be configured to sense a quality of water within the water storage tank. The dry mist generator may generate a dry mist using water from the water storage tank, and the ozone generator may generate ozone that is to be mixed with the dry mist to create an ozone infused dry mist. The system controller may be carried by the housing and may in communication with the water level sensors, the water quality sensors, the dry mist generator, and the ozone generator.

The ozone infused dry mist may be expelled from the housing to an environment external to the housing and the system controller may be operable to receive a signal from the water quality sensor. Upon the system controller receiving a signal from the water quality sensor that the quality of the water within the storage tank is below a predetermined quality level, the system controller may cause the water within the storage tank to be drained.

The system may include at least one of a manual valve and an electronic valve that may be positioned in fluidic communication with the water source and the water filters. The system may further include a water reservoir that may be in fluid communication with the water purifier and the water storage tank. The system may yet further include a water storage tank valve that may be in fluid communication with the water purifier and the water reservoir, and the water storage tank valve may be in communication with the system controller.

The system controller may be operable to receive a signal from the water level sensors. Upon the system controller receiving a signal from the water level sensors that the water level within the water storage tank is below a predetermined lower level, the system controller may cause water to flow into the water storage tank. Upon the system controller receiving a signal from the water level sensors that the water level within the water storage tank is at a predetermined upper level, the system controller may cause the water to stop flowing into the water storage tank.

The system may further include a sterilizer carried by the water storage tank. The sterilizer may be in communication with the system controller. The water storage tank may include a dispensing line that extends to a position external to the housing, and via the dispensing line the ozone infused dry mist may be expelled from the housing to the environment.

The water storage tank may include a blower in communication with the system controller. The blower may have an activated mode that may cause the ozone infused dry mist to be moved from within the water storage tank, through the dispensing line, and external to the housing. The system may yet further include one or more oxygen tanks that may be in fluid communication with the ozone generator and a regulator. The regulator may also be in fluid communication with the ozone generator.

The system controller may be operable to receive a signal from the dry mist generator, and the system controller may be configured to activate and deactivate the humidifying system based on a signal received from the dry mist generator. The system controller may be operable to receive a signal from the ozone generator, and the system controller may be configured to activate and deactivate the humidifying system based on a signal received from the ozone generator.

The system may include one or more humidity sensors in communication with the system controller. The humidity sensors may be configured to detect a humidity level of an environment external to the housing. The system controller may be operable to receive a signal from the humidity sensors, and the system controller may be configured to activate and deactivate the humidifying system based on a signal received from the humidity sensors.

Upon the system controller receiving a signal from the humidity sensor that the humidity level is above a predetermined humidity level, the system controller may cause the humidifying system to decrease production of the dry mist and ozone, and/or stop production of the dry mist and ozone. Upon the system controller receiving a signal from the humidity sensors that the humidity level is below the predetermined humidity level, the system controller may cause the humidifying system to increase production of the dry mist and ozone.

The system may further include a plurality of water pressure sensors that may be in communication with the system controller, and the system may yet further include a respective plurality of shutoff valves. Upon the water pressure sensors detecting a water pressure that is above a predetermined water pressure level, the system controller may be configured to send a water flow cutoff signal to at least one of the shutoff valves.

Another embodiment of the humidifying system according to the present invention is directed to a humidifying system that may include a housing, one or more water filters, a water purifier, a water storage tank, a water reservoir, a dispensing line, a sterilizer, a dry mist generator, an ozone generator, and a system controller. The water filters, water purifier, water storage tank, water reservoir, and system controller may be carried by the housing. The water filters may be in fluid communication with a water source, the water purifier may be in fluid communication with the water filters, and the water storage tank, water purifier, and the water reservoir may all be in fluid communication with each other.

The dispensing line may extend to a position external to the housing. The system controller may in communication with one or more of the sterilizer, dry mist generator, and the ozone generator. The dry mist generator may generate a dry mist using water from the water storage tank, and the ozone generator may generate ozone that may be mixed with the dry mist to create an ozone infused dry mist that may be expelled from the housing to an environment external to the housing via the dispensing line.

Another embodiment of the humidifying system according to the present invention is directed to a humidifying system that may include a housing, one or more water filters, a water purifier, water storage tank, one or more water level sensors, a water quality sensor, a dry mist generator, ozone generator, one or more humidity sensors, one or more water pressure sensors, one or more shutoff valves, and a system controller. The water filters, water purifier, water storage tank, and system controller may be carried by the housing.

The water filters may be in fluid communication with a water source, the water purifier may be in fluid communication with the water filters, and the water storage tank may be in fluid communication with the water purifier. The water quality sensor may be configured to sense the quality of the water that is within the water storage tank, and the humidity sensors may be configured to detect the humidity level of an environment that is external to the housing.

The dry mist generator may generate a dry mist using the water in the water storage tank, and the ozone generator may generate ozone that may be mixed with the dry mist to create an ozone infused dry mist. The ozone infused dry mist may be expelled from the housing to an environment external to the housing.

The system controller may be positioned in communication with one or more of the water level sensors, the water quality sensor, dry mist generator, ozone generator, the humidity sensors, the water pressure sensors, and the shutoff valves. The system controller may be operable to receive a signal from the one or more of the water level sensors, the water quality sensor, dry mist generator, ozone generator, the humidity sensors, and the water pressure sensors.

Upon the system controller receiving a signal from the at least one water level sensor that the water level within the water storage tank is below a predetermined lower level, the system controller may cause water to flow into the water storage tank. Upon the system controller receiving a signal from the at least one water level sensor that the water level within the water storage tank is at a predetermined upper level, the system controller may cause the water to stop flowing into the water storage tank.

Upon the system controller receiving a signal from the water quality sensor that the quality of the water within the storage tank is below a predetermined quality level, the system controller may cause the water within the storage tank to be drained. The system controller may be configured to activate and deactivate the humidifying system based on a signal received from either or both of the dry mist generator and the ozone generator.

Upon the system controller receiving a signal from one or more of the humidity sensors that the humidity level is above a predetermined humidity level, the system controller may cause the humidifying system to either decrease production of the dry mist and ozone or stop production of the dry mist and ozone. Upon the system controller receiving a signal from the at least one humidity sensor that the humidity level is below the predetermined humidity level, the system controller may cause the humidifying system to increase the production of the dry mist and ozone. Upon detection of a water pressure above a predetermined water pressure level, the system controller may be configured to send a water flow cutoff signal to one or more of the shutoff valves.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1A:
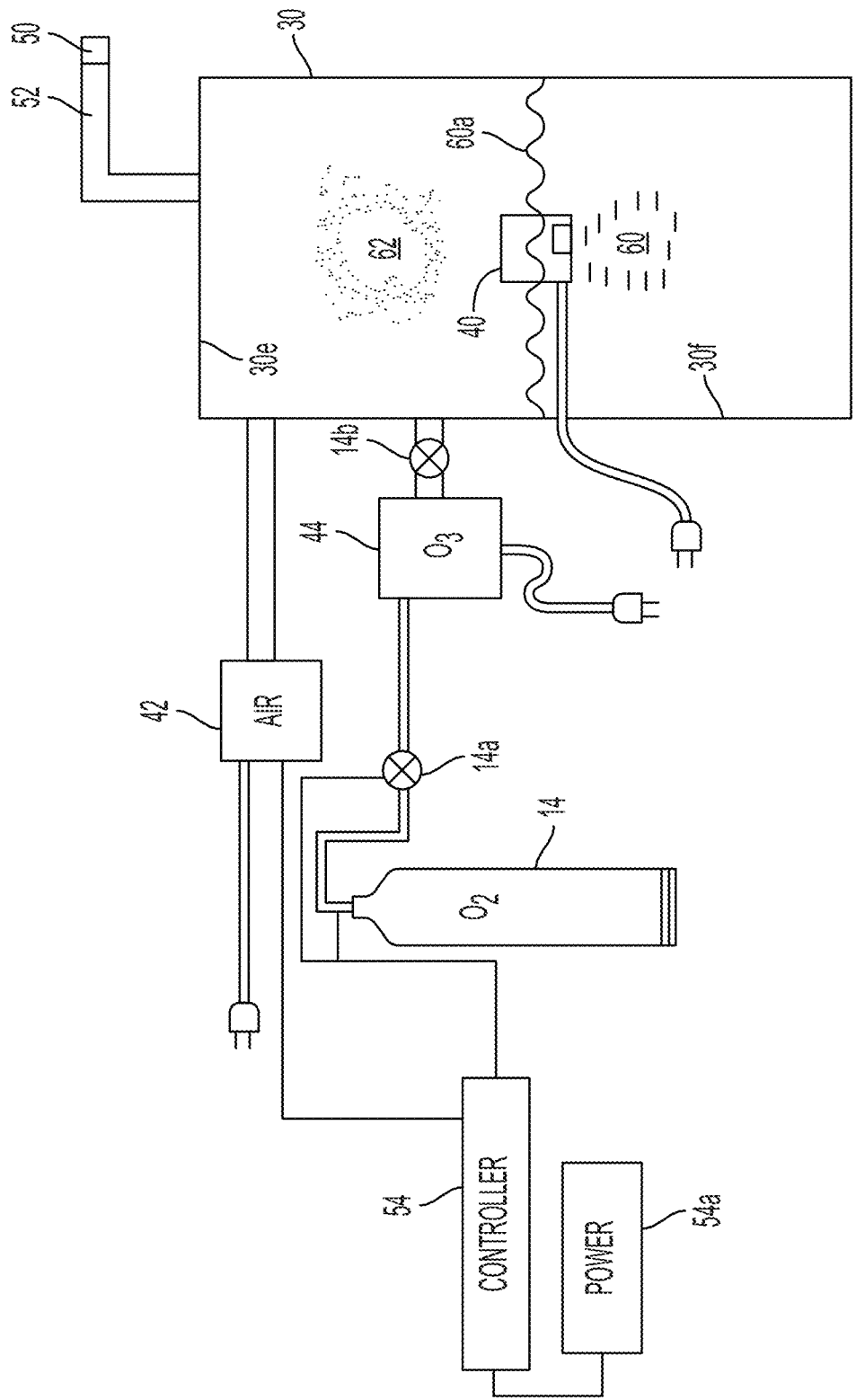
FIG. 1A shows a schematic, perspective view of a humidifying system according to an embodiment of the present invention.

FIG. 1A shows a schematic diagram to of the crux of the invention, which is a process and system to generate an ozone saturated dry mist in an enclosed water storage tank 30 using an ultrasonic oscillator 40, generate ozone from oxygen and mix the ozone with the dry mist to saturate with dissolved ozone, and dispense the ozone saturated dry mist through a dispensing hose 52 onto hard surfaces, soft surfaces and to be in fluid communication with airborne particles to sanitize, sterilize, and/or disinfect and or deactivate bacteria and viruses. The provision of a dry mist by the present invention advantageously allows for the above features to be carried out without surface wetting.

To generate dry mist, air from air blower 42 (under low pressure) and ozone from ozone generator 44 are preferably simultaneously directed into the blending chamber 30e in water storage tank 30 above the surface 60a of the water 60. The present invention also includes a dry mist generator. The dry mist generator may, for example, be provided by an ultrasonic oscillator 40 that generates dry mist that rises into air flow and ozone flow volume ratios to saturate the dry mist blending chamber area 30e completely with an ozone saturated dry mist. Those skilled in the art will appreciate that the dry mist generator may also be provided by other devices, and the use of other devices to provide dry mist is contemplated to be included in the present invention. The ozone saturated dry mist in chamber 30e is directed, under low relative pressure, through a distribution and sanitizer hose 52 and out a nozzle 50 onto a desired hard or soft surface and airborne particles to be sanitized and/or disinfected, without wetting the surface.

An electronic controller 54 may be used to operate and manage distribution of the ozone saturated dry mist, and to control the generation of ozone from the oxygen supply tank 14 supply and pressure valves 14a, and to ensure and maintain saturation quantity and ratios for the sanitation and/or disinfecting ozone saturated dry mist for maximum efficiency. The overall air blower air and oxygen used in the ozone generator, as well as ozone flow rates, control the amount of ozone to saturate into the dry mist in the water storage tank blending chamber 30e to obtain an optimum ratio of dry mist and ozone for sanitizing and/or disinfecting hard and soft surfaces and airborne particles, and generation control ratios is the responsibility of sensors and the controller 54 in its operation of all of the essential components of the system.

Figure 1B:
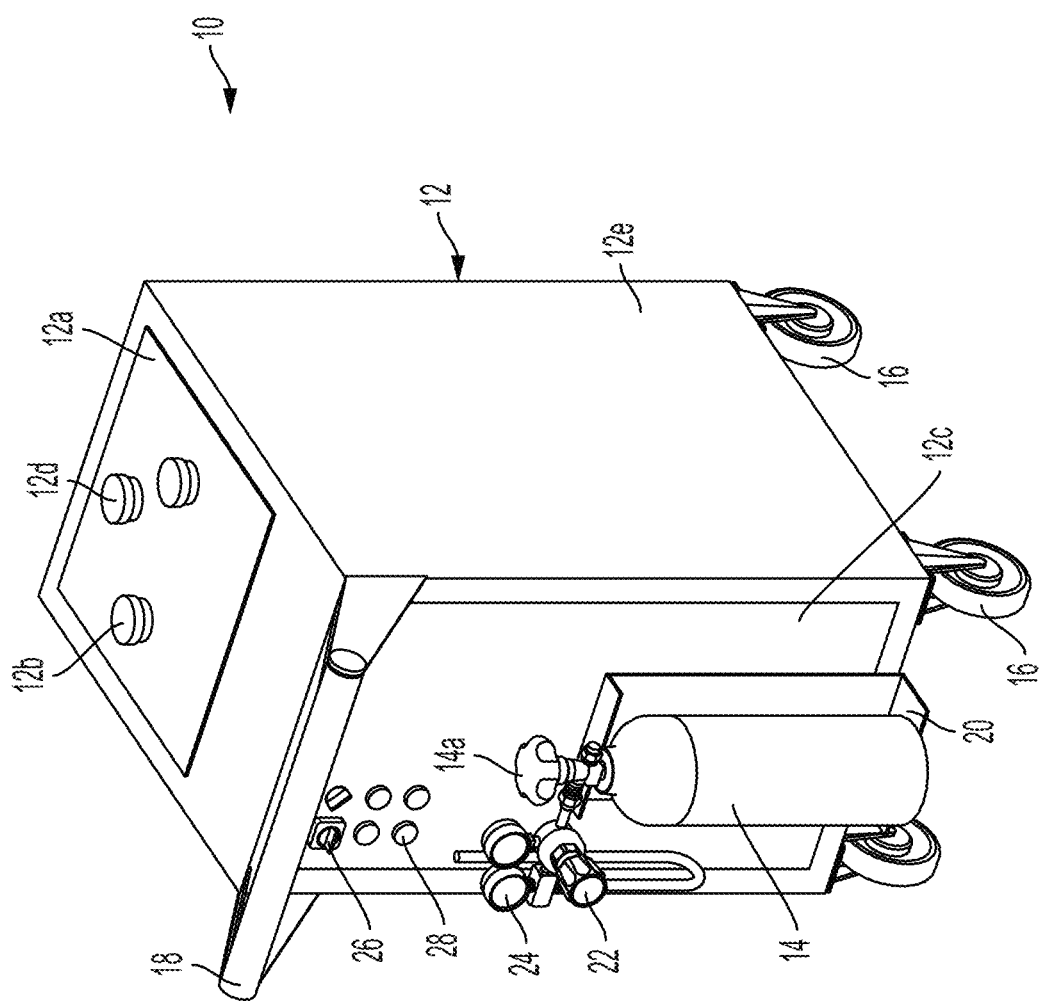
FIG. 1B is a perspective view of the exterior housing of a portable embodiment of a humidifying system according to an embodiment of the present invention.

Referring now to FIG. 18, the ultrasonic ozone saturated dry mist dispenser and ozone sanitizer and/or disinfection system exterior housing 12 described herein is shown, in one embodiment, as a portable system 10, that includes an exterior housing 12 having three rectangular, vertical sides 12d, a rectangular door 12 that opens outwardly, a bottom panel, top rectangular panel 12a that includes two threaded access fitting ports 12b and 12d, with caps. One of the access fitting ports 12b is used to allow water to be poured into the water storage tank inside the exterior housing 12. The other access fitting 12d is used to connect to a system ozone saturated dry mist sanitizer dispensing hose (not shown) in FIG. 1B.

Those skilled in the art will appreciate that although the exterior housing 12 is shown as having three rectangular, vertical sides, the housing may be provided in any shape, and the door may also be provided to have any shape. Further, although the door is depicted as opening outwardly, it is contemplated that the door may also open inwardly.

The mobile platform exterior housing 12 may include manual handle 18 and four wheels 16 that allow the system 10 to be manually positioned and moved to different desired locations for sanitizing and disinfecting with a dispensing hose and nozzle, in some embodiments.

Door 12c supports an oxygen tank 14 that is secured to the door 12c by a support bracket 20 that firmly holds the oxygen tank 14 in place, while being suspended and attached to housing 12. An oxygen tank 14 manual on/off flow valve 14a is provided on oxygen tank 14. Another on/off flow valve 22 and oxygen pressure gauges 24 that can measure the pressure in the oxygen tank 14, while valve 22 allows the oxygen tank to be turned on and off when providing oxygen to an ozone generator 44, (FIG. 2), discussed below. Also mounted on door 12c is a system on-off power switch 26, and four status lights 28 that provide status of the system 10 operation, power on and off, the sanitizing operation is "on," high water level, and minimum water level in the water storage tank. Another status light could show low oxygen $O_2$. Those skilled in the art will appreciate that although four status lights are shown, the objects, features and advantages of the present invention may be provided and carried out using any number of status lights to indicate any number of notifications to a user.

Figure 2:
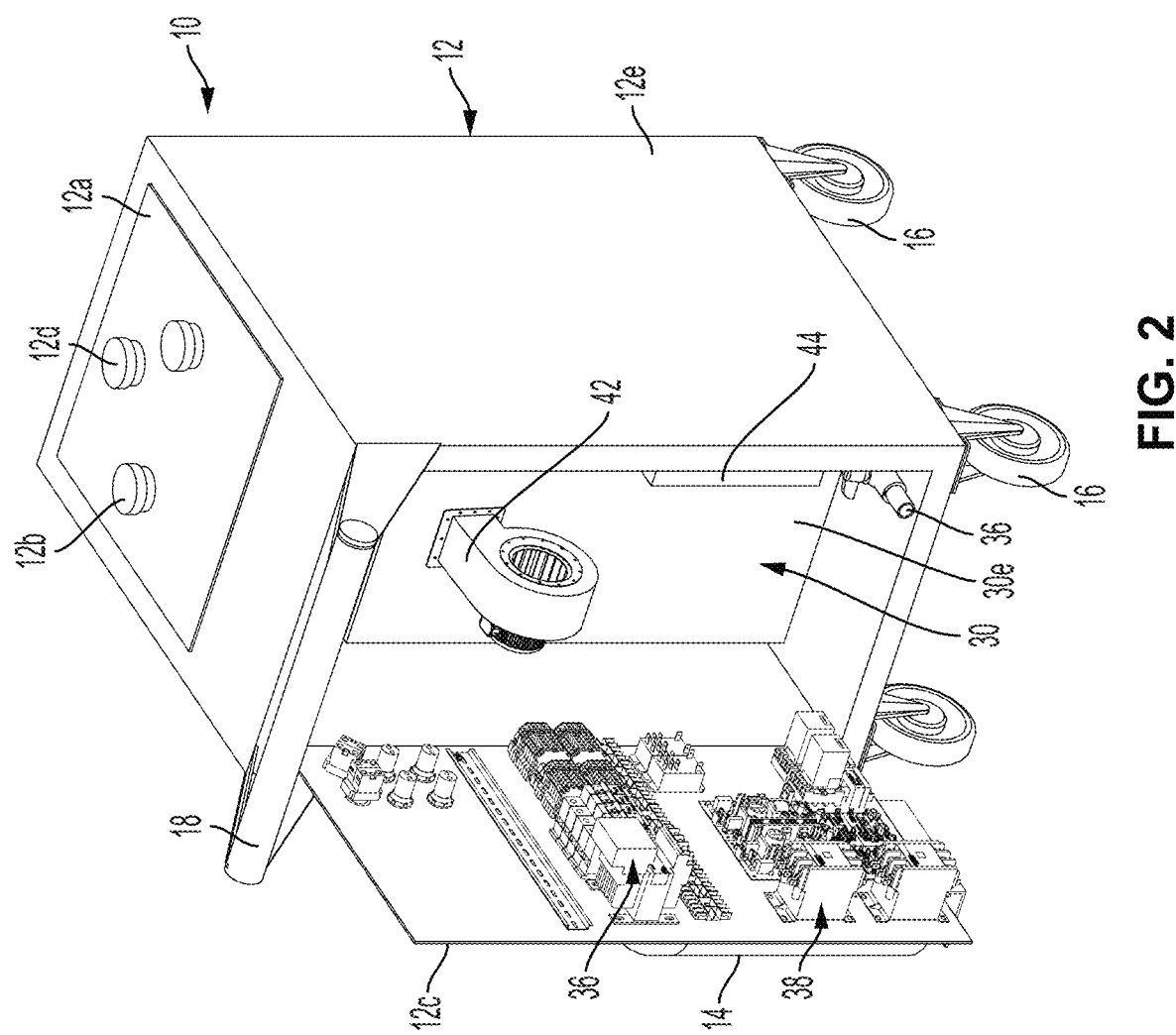
FIG. 2 is a perspective view of the portable embodiment shown in FIG. 1B within an end door open.

Referring now to FIG. 2, the system 10 is shown, with door 12d in the open position. The inside of the exterior housing 12, and the components and equipment that generate the ozone saturated dry mist and dispense the ozone saturated dry mist for sanitation, sterilization, deactivation and/or disinfection are shown.

A major component of the system 10 is a water storage tank 30 that occupies a volume inside of the exterior housing 12. The water storage tank 30 is substantially a rectangular six-sided cube or rectangular prism that is used to receive and store pure water. Although a rectangular shape for the exterior housing 12 is shown, those skilled in the art will appreciate that the shape of the housing can be anything while still carrying out the objects, features and advantages according to the present invention. The water, vibrated by an ultrasonic oscillator, becomes the ozone saturated dry mist used in the invention. The water storage tank 30 has rigid metal walls that are substantially rectangular, a rectangular floor or base and a rectangular top that has at least two access fittings around ports. Although a rectangular shape of the water storage tank is described above, those skilled in the art will appreciate that the water storage tank may have any shape while still carrying out the advantages, features, and benefits according to the present invention. For example, the water storage tank may be cylindrical in shape. Further, those skilled in the art will appreciate that the present invention may include a plurality of water storage tanks. One access fitting port is for receiving water to be used in the water storage tank and a second access fitting port is for dispensing the ozone saturated dry mist sanitizer from the water storage tank 30, described in detail below. It is preferable that the water used in the water storage tank is purified water, or filtered water, but those skilled in the art will appreciate that any other type of water an also be used, such as, for example, distilled water.

In FIG. 2, an air blower 42 and its outlet are attached to one of the vertical water storage tank 30 side walls 30*e*. An ozone generator 44 is attached physically to the inside of exterior vertical wall 12*e* and has an outlet conduit (not shown) attached to the same vertical water storage tank wall 30*e* as the air blower 42. Thus, air that is blown into the water storage tank 30 from the same vertical side wall 30*e* as ozone is being directed into the water storage tank 30 from the same side wall 30*e* is shown below. The water storage tank 30 may have sensors (not shown in FIG. 2) to determine the maximum and minimum water levels permitted in the water storage tank so that the incoming air from air blower 32 along with the incoming ozone directed into the water storage tank 30 are above the water surface.

Inside the water storage tank 30 there is an inductive outside float, housing an ultrasonic oscillator used to generate the dry mist that gets mixed by incoming air from air blower 42 along with ozone being generated by ozone generator 44. This operation is discussed below. Near the bottom of the water storage tank 30 is a drain and drain valve 34 that allows the water storage tank 30 to be drained by gravity when necessary to remove any undesired water. FIG. 2 shows, mounted on door 12*d* on the inside, an electrical control unit 36 and an electrical power unit 38, all of which may include the logic circuits and power necessary for controlling the air blower 42, the ozone generator 44 for generating ozone and operating the dry mist ultrasonic oscillator (that floats inside the water storage tank 30). Electronic operating units 36 and power units 38 also control solenoid valves and the flow rates of the air coming from blower 42 and the dispensing rate of dry mist to achieve the proper proportions of dry mist and ozone to create the ozone saturated dry mist for use in the system 10, discussed below.

Referring now to FIG. 3, an exploded view of system 10 is shown. The water storage tank 30 is shown elevated, for illustration purposes, above the exterior housing 12. The water storage tank 30 includes an enclosed, six-sided rectangular prism that includes a rigid metal top surface 30*a* that has two access fittings and ports 30*b* and 30*c*. Those skilled in the art will appreciate that although the water storage tank 30 is depicted as a six-sided rectangular prism, it can be provided by any shape such as, for example, a cylindrical storage tank. Access fitting 30*b* is a port to receive pure water that is deposited into the water storage tank 30 when necessary. Access fitting 30*c* is a port used to dispense the ozone saturated dry mist sanitizer and/o disinfectant, generated in the water storage tank 30 mixing chamber 30*e*. Each access fitting port, 30*b* and 30*c*, is connected to the lid (not shown in FIG. 3) to a comparably functioning access fitting port, directly above, in exterior housing 12*a* top panel, shown as access fittings ports 12*b* and 12*d* (FIG. 1). The exterior housing access fitting port 12*b* can be connected by a conduit to the water storage tank 30*b* to allow the input of water from outside the exterior housing 12 into the water storage tank 30 in order to fill the water storage tank to the correct level with water. Access fitting port 12*d*, FIG. 1, in the exterior housing panel 12*a*, is connected to a conduit (not shown in FIG. 3) attached to water storage tank top panel access fitting port 30*c* disposed in the top surface 12*a* of the exterior housing, that connects to a dispensing hose (FIG. 1A) for dispensing the ozone saturated dry mist ozone sanitizer from inside water storage tank 30 blending chamber 30*e*.

In FIG. 3, the water storage tank 30 contains inside an ultrasonic oscillator 40 (elevated above for illustration purposes). The ultrasonic oscillator 40 is an ultrasonic transducer that generates ultrasonic frequencies from a piezoelectric crystal using ceramic discs submerged in water in the water storage tank to generate dry mist in the water storage tank blending chamber, 30e above the water surface. The water storage tank 30 includes a water level sensing device 30d that sets the displays maximum height (or depth) of water in the water storage tank 30. The ultrasonic oscillator 40 includes a float 40b, that is doughnut-shaped in some embodiments. The float 40b may be connected to an interior flat panel that includes a plurality of ultrasonic oscillator (frequency generating) discs that are the transducers that vibrate to generate dry mist in the water while the ceramic discs are submerged below the water, while suspended on float 40a. In some embodiments, applicants have an ultrasonic oscillator with 12 discs mounted on a flat panel that is connected to a float so that the discs are suspended below the water surface and maintain at least a one-half inch below the water surface at all times to permit the generation of dry mist. The number of ultrasonic piezoelectric oscillator ceramic discs, to generate dry mist, which in one embodiment is 12, can vary widely, dependent on the water storage tank 30 and its function. In this embodiment, the invention 10 is a portable unit for sanitizing and/or disinfecting hard and soft surfaces and airborne particles with an ozone saturated dry mist. The ozone saturated dry mist ultrasonic oscillator 40 has an electrical connection that provides the proper voltage and amperage to each individual oscillator disc 40a that vibrates together and are all connected electrically parallel so the ceramic discs 40a all share the same voltage during operation. The ultrasonic oscillator 40, as a dry mist generator to create the dry mist to dissolve for the ozone to create an ozone saturated dry mist sanitizer and/or disinfectant, is also connected to the system electrical operating system that controls its power, on and off, and its operation at all times.

Figure 4:
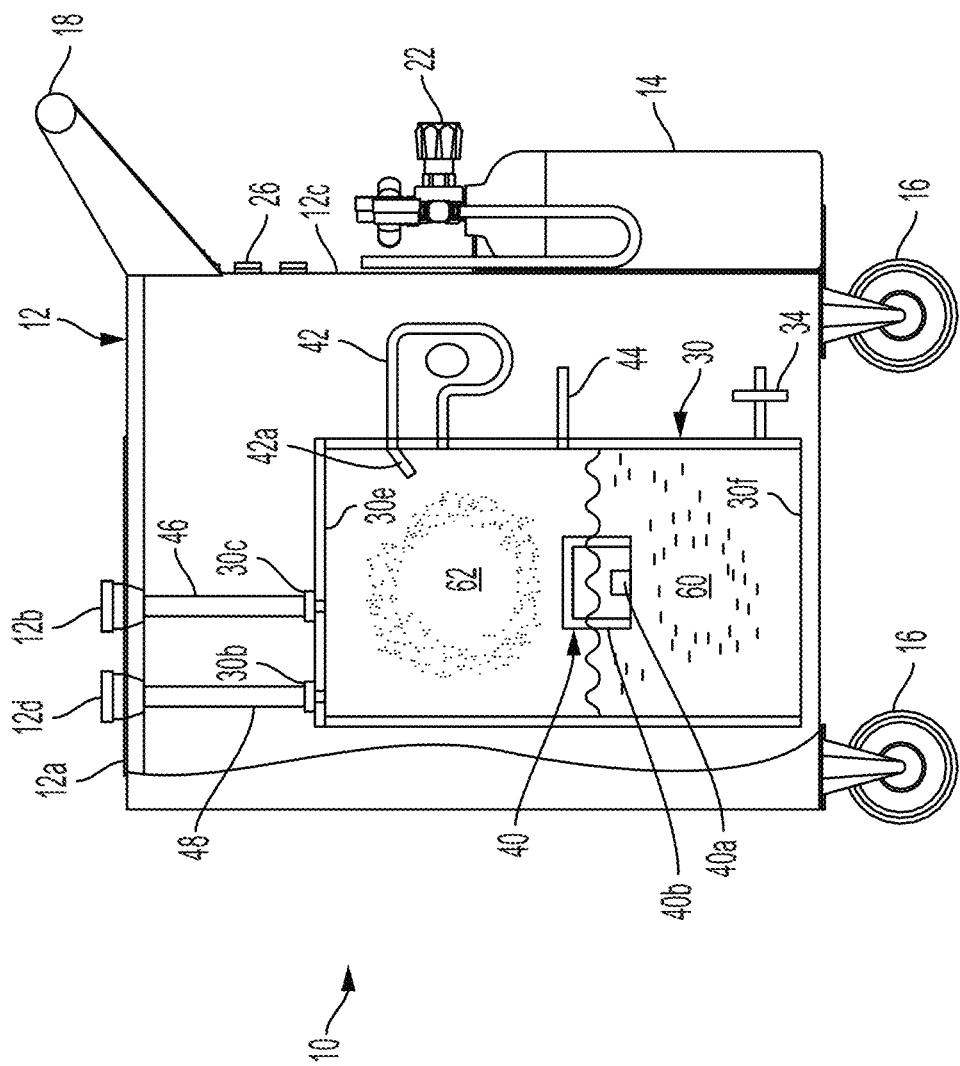
FIG. 4 shows a side elevational view of the humidifying system illustrated in FIG. 2 having portions partially cut away and showing a portion of the water storage tank shown in elevation and in cross-section.

Referring to FIG. 1A and FIG. 4, the method or process of sanitizing, treating, sterilizing and/or disinfecting and/or deactivating hard and soft surfaces and airborne particles in the ambient air to eliminate bacteria and viruses, primarily focuses on creating an ozone saturated dry mist in the water storage tank 30 using the ultrasonic oscillator 40. An air blower 42 directs air, under low pressure, into the water storage tank 30 and downwardly toward the surface of the water therein, above the level of the ozone entering the water storage tank. Ozone generator 44 generates the ozone that is directed into the water storage tank above the surface of the water, below the incoming air flow from the air blower, to mix with the dry mist being generated by ultrasonic oscillator 40 dry mist generator. The purpose of the invention is to generate a desired ratio of dry mist in union with the ozone, to create an ozone saturated dry mist, so that when the sanitizer dispenser dispenses the ozone saturated dry mist under low pressure on a hard or soft surface and airborne particles, the proper ratio is provided for the zone to act to eliminate bacteria and viruses on a hard or soft surface and airborne particles and at the same time the ozone saturated dry mist evaporates from the surface quickly, so that a sanitized and/or disinfected surface does not get wet or damp or leave any deleterious residue. Applicants have determined that 80 to 90, and up to 150 parts per million of ozone in the dry mist is very effective as a sanitizer and/or disinfectant for bacteria and viruses on hard and soft surfaces without wetting the surfaces, not leaving a deleterious residue harmful to humans.

Figure 3:
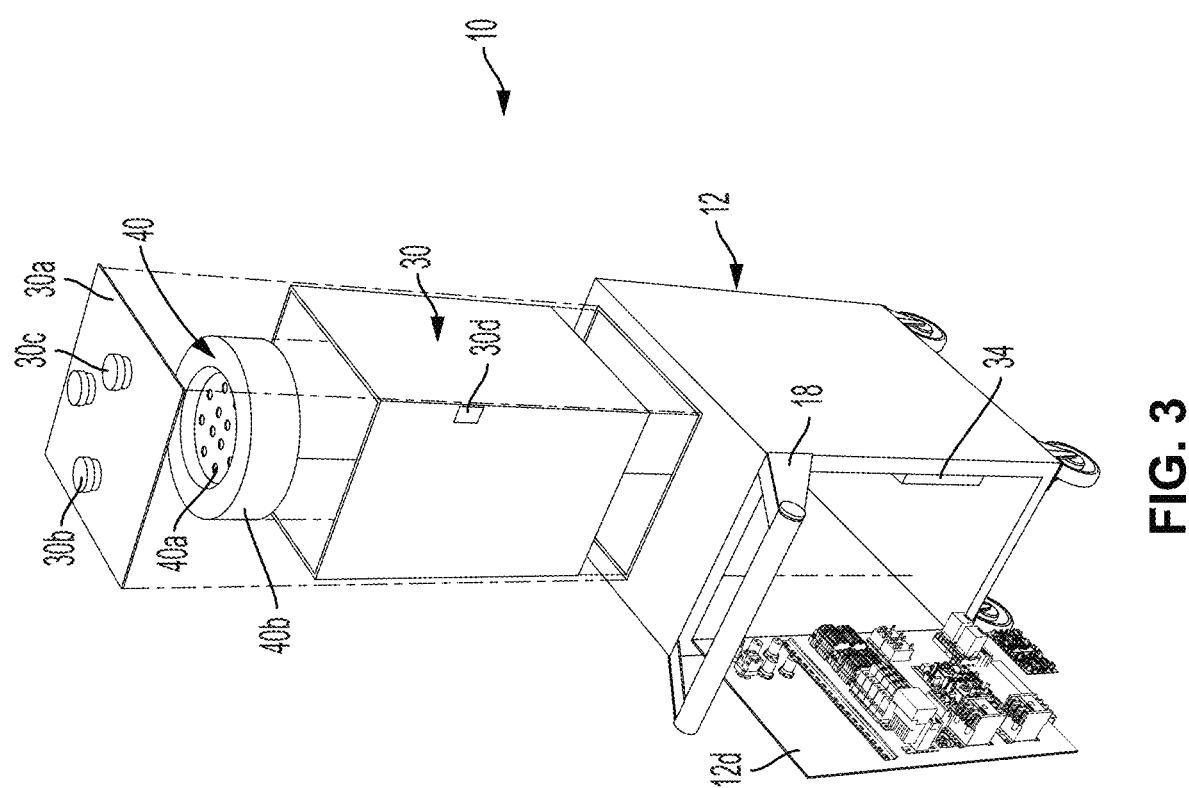
FIG. 3 is an exploded perspective view of the portable embodiment of the humidifying system illustrated in FIG. 2.

Referring now to FIG. 4, the invention system 10 is shown, with a side elevational view of exterior housing 12 cutaway on one side, so that the inside of the water storage tank 30 (viewed in cross-section) is represented schematically in operation, partially filled with water 30f. The water storage tank 30 lower volume 30f, contains water 60. Above the water surface in the upper volume blending chamber 30e of water storage tank 30 is an ozone saturated dry mist 62 that has been generated by the ultrasonic oscillator 40 attached to float 40a on the surface of water 60. Ultrasonic oscillator discs 40a (FIG. 3) act as transducer frequency generators to generate dry mist 62 in the water storage tank 30, housed in the ultrasonic oscillator 40, and submerged to remain suspended below the water 60 surface. Also shown is the air blower 42 attached to the side wall of water storage tank 30 so that the air directed into the water storage tank upper area (above the water surface) containing the dry mist is directed downwardly by a diverter 42a, forcing the incoming air toward the water surface. Also mounted through the side wall of water storage tank 30 is the ozone generator 44 that also is positioned below the air blower 42 so that incoming ozone from ozone generator 44 is near the surface of the water 60 so that ozone interacts directly with the dry mist coming from the water surface and the downward air directed from air blower 42, creating ozone saturated dry mist 62 in the upper volume of water storage tank 30.

FIG. 4 shows conduits 46 and 48 each attached between the exterior housing panel 12a and the access fitting ports 12b and 12d and the water storage tank 30 access fitting ports 30b and 30c. Conduit 48 is used to supply water internally from the exterior housing 12 through access fitting port 12d into water storage tank access port 34, for filling the water storage tank 30 when necessary. Conduit 46 is used to disperse the dry mist and ozone mixture sanitizer in blending chamber 30e to create an ozone saturated dry mist from water storage tank 30 through water storage tank access fitting 30c and exterior housing access fitting 12b. connected to dispersing hose 52. (FIG. 1A). A nozzle 50 (FIG. 1A) may be attached on the end of the hose 52. The hose 52 and nozzle 50 direct the ozone saturated dry mist on hard and soft surfaces and airborne particles to be sanitized and/or disinfected. Therefore the system 10 is operated by providing power to air blower 42, ozone generator 44, and the ultrasonic oscillator 40 which has discs suspended underwater, approximately half an inch, that are vibrated to create the dry mist in the blending chamber 30e in the upper portion of water storage tank to create an ozone saturated dry mist 30. Also shown in FIG. 4 is a drain valve 34 which is connected outside of the exterior housing for emptying the water storage tank 30 of water.

The treating, dispensing, sanitizing, sterilizing, deactivating and/or disinfecting method and system can create a treating, sanitizing, sterilizing and/or disinfecting ozone saturated dry mist to sanitize and/or disinfect surfaces and airborne particles by creating a dispersed sanitizing evaporating dry mist vapor, super-saturated with ozone. The sanitizing ozone saturated dry mist is created using a pressure differential dispersant method. The ozone saturated dry mist will sanitize and or disinfect hard surfaces and airborne particles and penetrate porous surfaces and ambient air to sanitize and/or disinfect. It kills bacteria and viruses, and other pathogens on hard and soft surfaces and in ambient air.

In some embodiments, sanitizing apparatus utilizing the components, described in FIG. 1B-FIG. 3, can be mounted on a mobile platform, that includes wheels and a frame network with a handle, for manually moving and positioning an entire sanitation apparatus in various locations, which allow the delivery system to be positioned manually, thereby allowing a technician to thoroughly sanitize and/or disinfect an area with a mobile platform and the ability to manually position the output of the delivery system for sanitizing various surfaces.

The system of the present invention is for treating surfaces and airborne particles comprising. The system includes an exterior housing and an enclosed water storage tank mounted inside the exterior housing to store water. The system may also include a dry mist generator mounted on a water float to position the dry mist generator below a surface of the water stored in the enclosed water storage tank. The system may further include an air blower having an outlet connected to water storage tank above a predetermined water level. The system may still further include an oxygen tank having an outlet, and an ozone generator connected to the outlet of the oxygen tank. The system may also include a regulator and flow meter connected to the outlet of the oxygen tank and having an inlet conduit to the ozone generator to regulate a flow of oxygen into the ozone generator.

A volume of the water storage tank above the predetermined water level is defined as a blending chamber. Air dispensed from the air blower may be mixed with (or blended with) ozone dispensed from the ozone generator output to provide a mixture of ozone saturated dry mist having a predetermined saturation ratio of dry mist vapor and ozone. The system may further include an ozone saturated dry mist dispensing outlet for dispensing the ozone saturated dry mist.

The system according to the present invention may also be a mobile platform attached to the exterior housing. The air blower outlet may include an airflow diverter for diverting the output airflow in a direction of a surface of the water contained in the water storage tank. The dry mist may be generated at a rate of between about ⅕ liter per hour to 1 liter per hour, but those skilled in the art will appreciate that manipulation of any of the elements of the invention may provide generation of dry mist at any rate, and the flow rate listed above is not meant to limit the scope of the invention in any way.

The ozone generator may produce ozone at a rate of between about 3 grams per hour and 10 grams per hour. Those skilled in the art will appreciate that an ozone generator produces ozone at a rate outside of the above-referenced range may also be provided and is contemplated to be included within the scope of the present invention.

The air blower may generate air flow at a rate between about 5 cubic feet per minute and 15 cubic feet per minute. Those skilled in the art will appreciate that air flow may be generated from the air blower at any other volumetric rates and still be considered within the scope of the present invention.

The dry mist generator may be provided by an ultrasonic piezoelectric oscillator that includes one or more ceramic discs positioned to be submerged below the stored water surface. The one or more ceramic discs cause frequency vibration of the water to generate the dry mist in the water storage tank.

There are numerous examples of devices and articles that can be sanitized and disinfected of bacteria and viruses and other biological pathogens using the invention described herein, such as: modes of transportation, delivery vehicles, automobiles, trucks, ambulances, complete airplane including ventilation, trains, buses, spacecraft, subways, cruise ships, and boats; also buildings, including nursing homes, hotels, restaurants, motels, hospitals, office spaces, grocery stores, grocery carts; food processing, buffets and salad bars, kitchens and food preparation service areas; and indoor and outdoor furniture.

Another embodiment of the present invention, as shown and described by the various figures and accompanying text, provides for a humidifying system 500 for sterilizing and/or humidifying an area of space, a surface, and/or objects. The system 500 may include a housing 502, at least one water filter 538, a water purifier 540, a water storage tank 504, a dispensing line 518, a dry mist generator 544, an ozone generator 526, and a system controller 534 as illustratively shown in FIGS. 9 and 10. Moreover, the system 500 may include a display unit 556, an input member 554, a drain line 552, a power line 558, and a plurality of attachment members 560, as illustratively shown in FIGS. 5, 7-8, and 10.

The system 500 may further include a number of valves, such as, a manual valve 510, a manual reservoir valve 562, an electronic valve 512, a water storage tank valve 514, a drain valve 516, and one or more shutoff valves that may include a first shutoff valve 536 and a second shutoff valve 548 (hereinafter, without limitation, the first shutoff valve 536 and the second shutoff valve 548 may be referred to collectively, separately, or any combination thereof as the "shutoff valves"), as illustratively shown in FIGS. 5-6 and 9-10. These valve components may be referred to collectively, or separately (or any number of components in combination) as the valves of the system 500 according to the present invention.

The system 500 may yet further include a plurality of sensors including at least one water level sensor 532, a water quality sensor 520, at least one humidity sensor 550, and a plurality of water pressure sensors 546. These sensor components may be referred to collectively, or separately (or any number of components in combination) as the sensors of the system 500 according to the present invention. Furthermore, the system 500 may include a water reservoir 542, a sterilizer 522, a blower 524, an oxygen tank 528, and a regulator 530. For simplicity, all the aforementioned components within paragraphs [0070]-[0072] may be referred to collectively, or separately (or any number of components in combination) as the electronic components of the system 500 according to the present invention. More specifically, the electronic components may, for example, include an ozone generator 526, a dry mist generator 544, a system controller 534, a display unit 556, an input member 554, a power line 558, an electronic valve 512, a water storage tank valve 514, a drain valve 516, shut off valves 536, 548, a water level sensor 532, a water quality sensor 520, a humidity sensor 550, the water pressure sensor 546.

Now referring to FIGS. 5 and 7-9, the housing 502 may be configured to carry, house, and/or mount the various components and members of the humidifying system 500 described herein. The housing 502 may be configured to have removable portions that may be removably attached to the housing 502 by one or more attachment members 560. The attachment members 560 may comprise of bolts, screws, clips, nails, and/or any other removable attachment component as understood by those skilled in the art.

Now referring to FIGS. 5-6 and 9, the at least one water filter 538 may be carried by the housing 502 and may include an inlet and an outlet for being in fluidic communication with other components of the system 500. The inlet of the at least one water filter 538 may be in fluidic communication with a water source 506. The water filter 538 may be used to filter out unwanted particulate matter, compositions, chemicals, and pathogens from the water it receives. If more than one water filter 538 is used, then the water filters 538 may be in fluidic communication with one another by one or more of their inlets and outlets, and in fluidic communication by one or more of their inlets with the water source 506. The at least one water filters 538 may be in a parallel or series configuration so that each of the at least one water filters 538 may filter the water directly from the water source 506 concurrently in a parallel configuration, or at least one of the at least one water filters 538 may filter the water from the water source 506 and at least one of the at least one water filters 538 may then filter the water as a series of stages configuration to filter the water consecutively after the first water filter 538, or the at least one water filters 538 may be in a combination configuration of parallel and series. A number of different water filters may be used as the at least one water filter 538, for example, without limitation, activated carbon, ion exchange, reverse osmosis, mechanical, sediment filter, ultraviolet, and/or any other type of water filter as understood by those skilled in the art.

The water purifier 540 may be carried by the housing 502 and may include an inlet and an outlet for fluidic communication. The inlet of the water purifier 540 may be in fluidic communication with one or more of the at least one water filter 538 and the water source 506. The water purifier 540 may be used to remove materials, impurities, matter, and/or pathogens from the water it receives and purify said water. A number of different water purifiers may be utilized as the water purifier 540 of the system 500. For example, without limitation, activated carbon, ion exchange, reverse osmosis, mechanical, sediment filter, ultraviolet, ultrafiltration, and/or any other type of water purifier as understood by those skilled in the art.

In an embodiment of the present invention that uses a type of water purifier that requires a drain line to dispose of waste materials, impurities, matter, and/or pathogens removed from the water it purifies, a water purifier drain line 540' may be fluidically connected to a drain outlet of the water purifier 540 and extending in fluidic communication to a waste drain 508 and/or the drain line 552. The waste drain 508 may be attached to and accessible inside the housing 502, or the waste drain 508 may be located outside of the housing 502. Further details about the drain line 552 follows further below.

Figure 5:
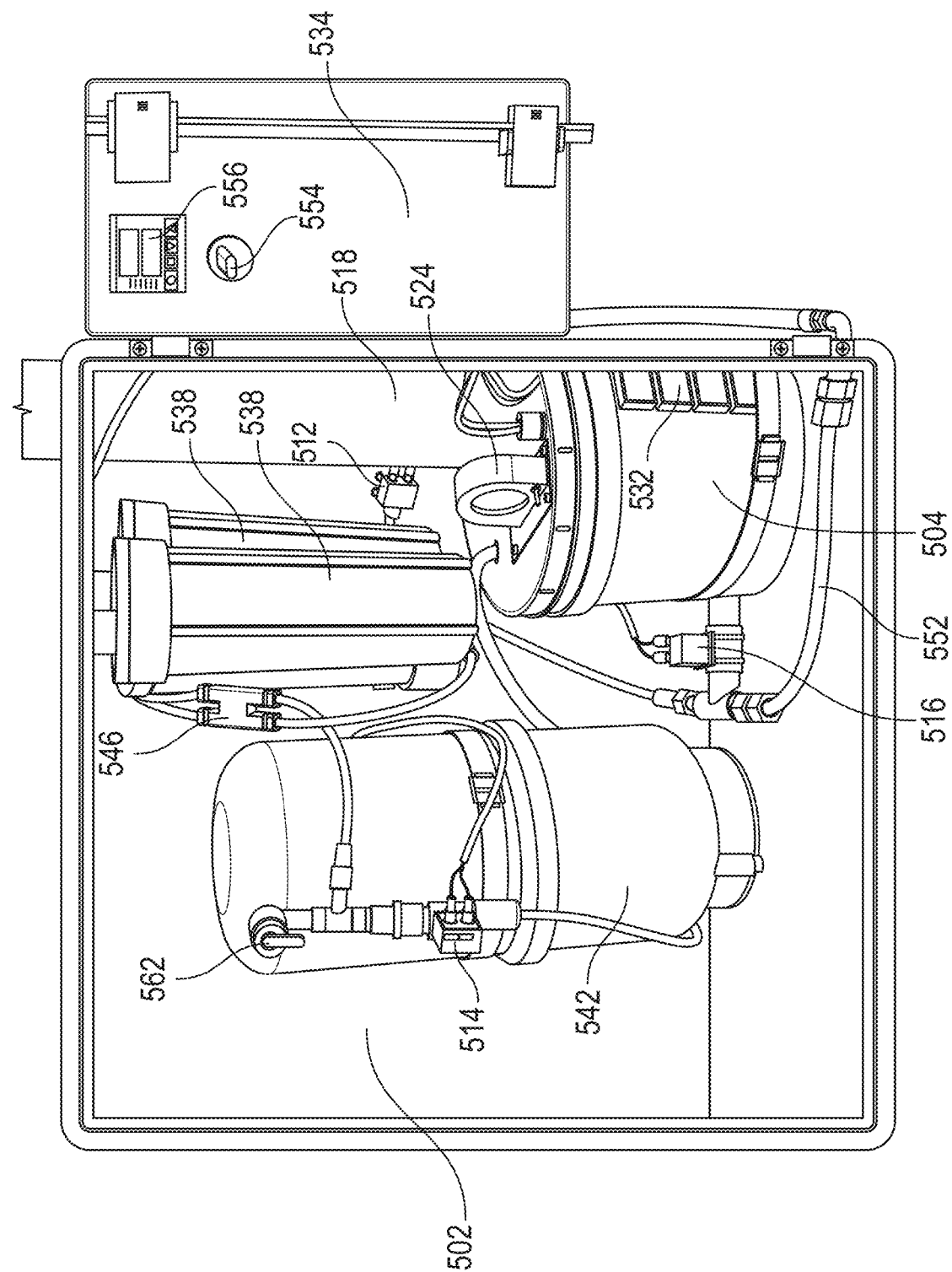
FIG. 5 is a partial perspective view of a humidifying system according to an embodiment of the present invention.
Figure 6:
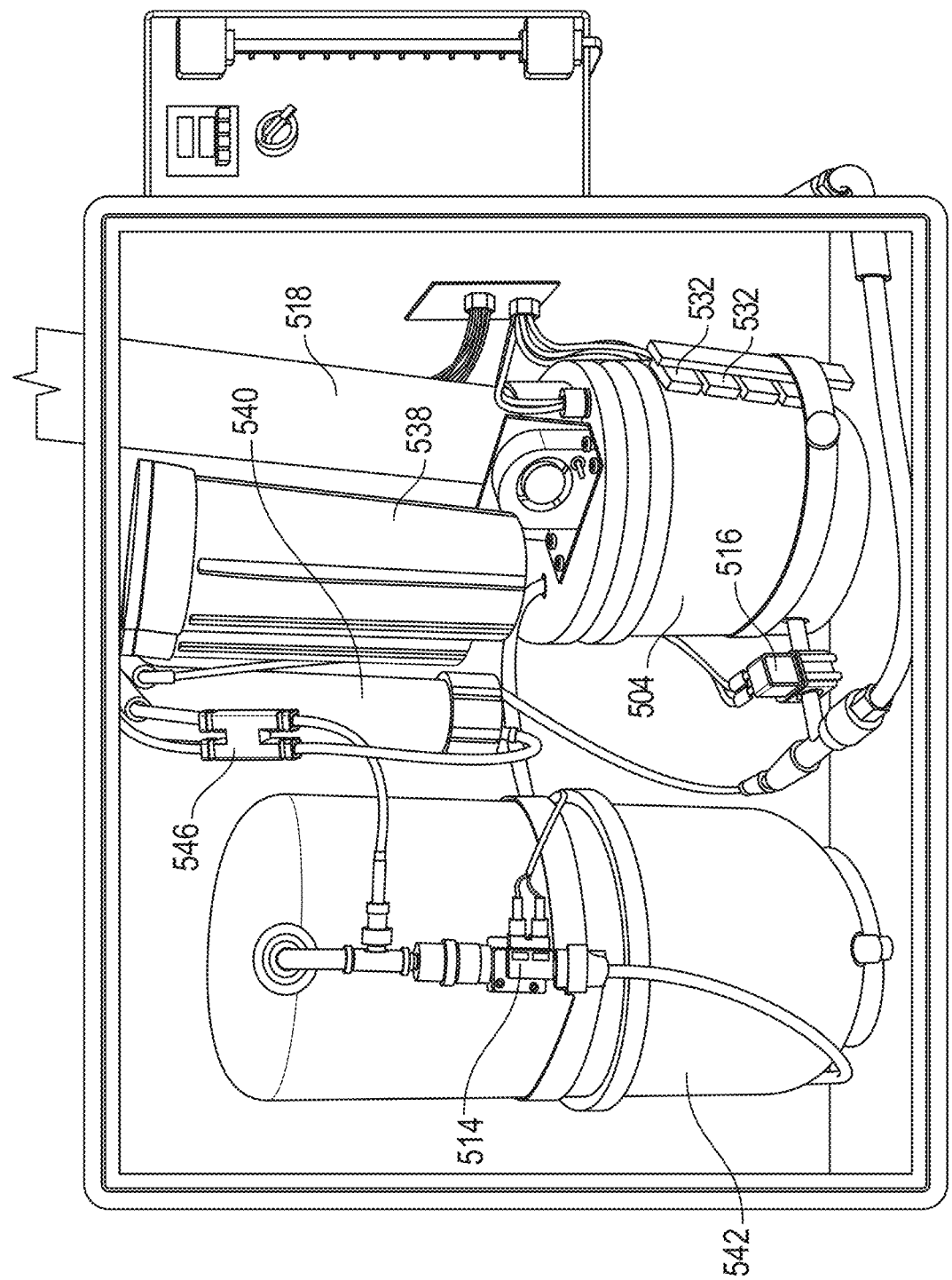
FIG. 6 is another partial perspective view of the humidifying system in FIG. 5.
Figure 9:
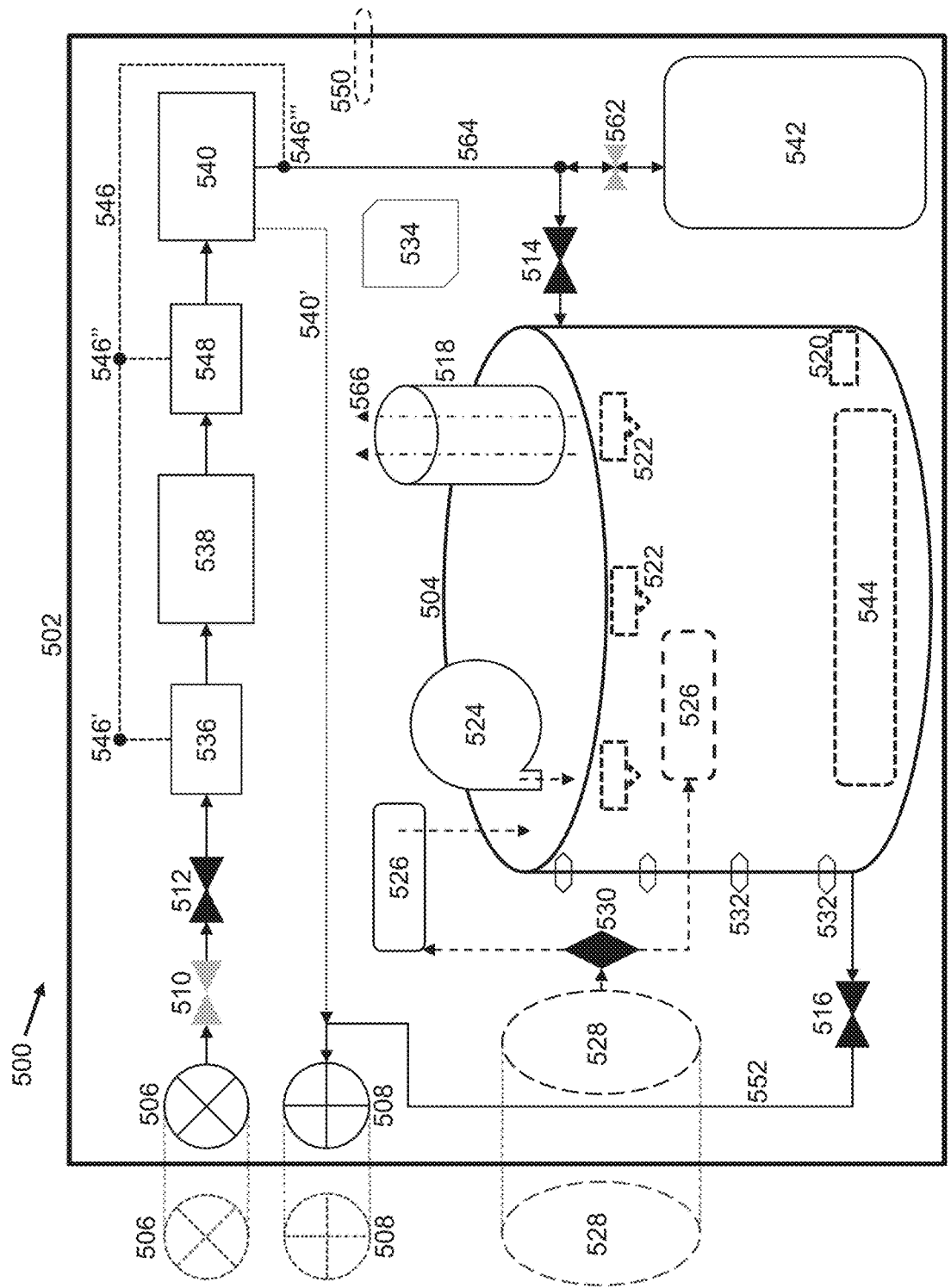
FIG. 9 is a schematic representation of a humidifying system according to an embodiment of the present invention.

Continuing to reference FIGS. 5-6 and 9, the water storage tank 504 may be carried by the housing 502, and the water storage tank 504 may include an inlet and an outlet to be used for fluidic communication. The inlet of the water storage tank 502 may be in fluidic communication with one or more of the water source 506, the at least one water filter 538, and/or the water purifier 540. The water storage tank 504 may be configured to carry the water it receives from its inlet.

The dispensing line 518 may include a first end and a second end, and the first end may be attached and in fluidic communication with the water storage tank 504. The second end of the dispensing line 518 may extend to a position external to the housing 502 and to an environment external to the housing 502. Preferably, the first end of the dispensing line 518 may be attached and in fluidic communication with the water storage tank 504 at an upper portion of the water storage tank 504 such that the dispensing line 518 is attached at a position above the water carried by the water storage tank 504. The dispensing line 518 may comprise of a pipe, hose, line, conduit and/or any other elongated tube-like component for guiding fluidic travel as understood by those skilled in the art.

The dispensing line 518 may be braced, attached, and/or maintained in position where it connects with the water storage tank 504 and/or where it travels out from the housing 502. The dispensing line 518 may be configured to be held in place where it is attached, and/or it may be configured to be rotatably moved about an axis, such as, without limitation, by being attached with a ball bearing seal and/or bushing. The dispensing line 518 may be configured to allow for the travel of fluidic compositions and matter through its length. Preferably, the fluidic compositions and matter flow from the first end of the dispensing line 518 to and out of the second end of the dispensing line 518 into an environment external from the housing, or onto surfaces and/or objects. Those skilled in the art will notice and appreciate that a number of different components and materials can comprise the dispensing line 518, and/or that more than one dispensing line 518 may be used in the system 500 while still accomplishing all the goals, features, and advantages of an embodiment of the present invention.

Figure 7:
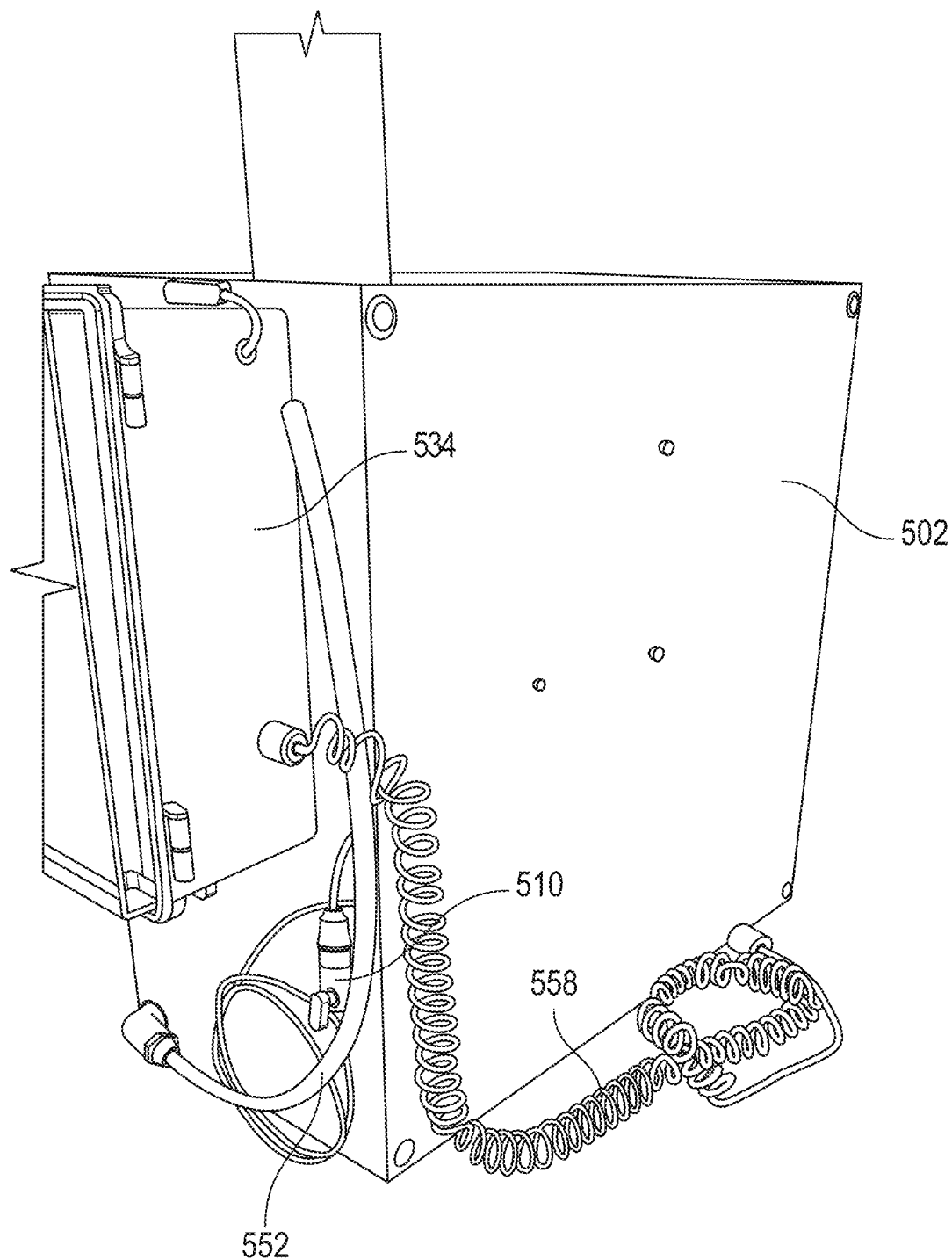
FIG. 7 is another partial perspective view of the humidifying system in FIG. 6.
Figure 10:
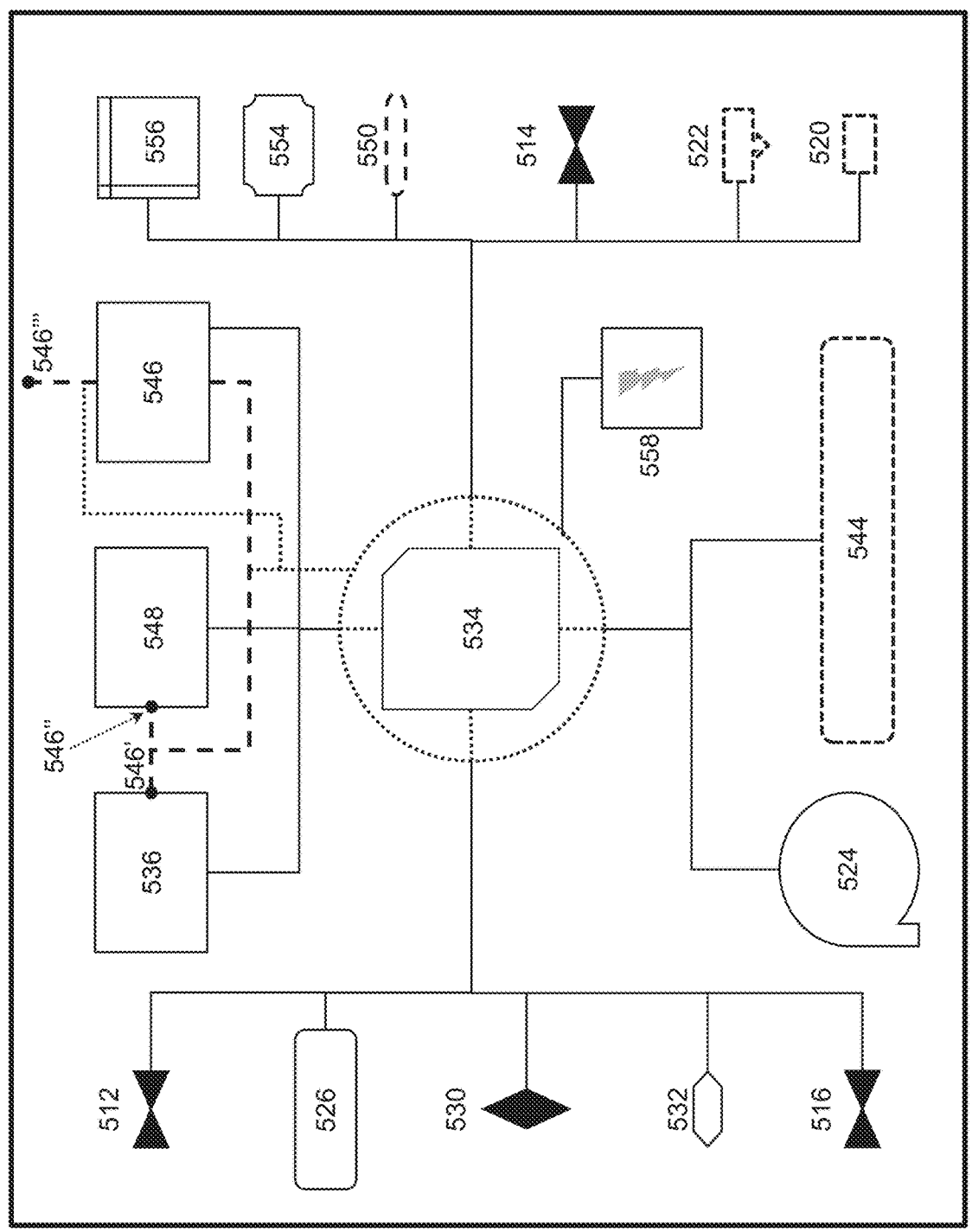
FIG. 10 is a schematic representation of communication connections of members of the humidifying system in FIG. 9.

Now referring to FIGS. 7 and 10, the system controller 534 may be carried by the housing 502 and/or attached to an inside or an outside surface of the housing 502. The system controller 534 may be in communication with a power line 558. The power line 558 may be used to supply the system controller 534 and the system 500 with electrical power. The power line 558 may extend to and connect to a supply of power (not shown), such as a power outlet, battery, or generator.

The system controller 534 may be in communication with the electronic components of the system 500 according to the present invention. The system controller 534 may be configured and/or operable to receive various signals from the electronic components of the system 500. The system controller 534 may be configured and/or operable to cause various predetermined actions to take place in response to the various signals. Greater detail and on the various signals and predetermined actions follows throughout below.

The system controller 534 may comprise of a number of different computational and/or communication devices and/or components. For example, without limitation, a central processing unit, random access memory, non-transient computer readable memory, motherboard, microprocessor, computer readable instruction communication device, input/output component, power supply device, and/or a single board computer such as, without limitation, a RaspbenyPi, Arduino, or Asus Tinker Board, and/or may include a microcontroller, microprocessor, or embedded processor. Those skilled in the art will notice and appreciate that a number of different components and devices may comprise the system controller 534 while still accomplishing all the goals, features, and advantages of an embodiment of the present invention.

The valves of the system 500 may be configured to be operable to move between and/or maintain an opened state and a closed state. The closed state may be defined as when the valve does not allow fluidic mediums to flow through said valve. The opened state may be defined as when the valve does allow fluidic mediums to flow through said valve up to a fully opened state. The fully opened state may be defined as when the valve allows for its maximum capable flow of fluidic mediums through said valve. The valves of the system 500 may be in communication with the system controller 534 and may be configured to be operated by the system controller 534 to move between and/or maintain the opened state and/or the closed state, and to be activated or deactivated by the system controller 534. Further details on the valves of the system 500 follows further below.

Now referencing FIG. 9, the dry mist generator 544 may be carried by the water storage tank 504 and configured to generate a dry mist using the water that is carried by the water storage tank 504. The dry mist generator 544 may comprise of an ultrasonic piezoelectric oscillator, as mentioned in greater detail above. The dry mist generator 544 may also include an immersed electrode, electric heater, gas heater, centrifugal device, piezoelectric transducer, and/or compressor that may be used to create a warm, cold, dry, and/or wet mist. The dry mist generator 544 may be positioned at a lower portion of the water storage tank 504 such that the dry mist generator 544 is likely to be in contact and/or submerged in the water carried by the water storage tank 504.

Continuing to reference FIG. 9, the ozone generator 526 may be carried by the housing 502 or by the water storage tank 504. The ozone generator 526 may be configured to generate ozone within and/or to be placed into the water storage tank 504 and mixed with the dry mist to create an ozone infused dry mist 566. The ozone generator 526 may comprise of an ultraviolet ozone generator, cold plasma ozone generator, corona discharge ozone generator and/or any other type of ozone generator as understood by those skilled in the art. If the ozone generator 526 is located outside of the water storage tank 504, then the ozone generator 526 may be in fluidic communication with the water storage tank 504 to allow for the generated ozone to flow into the water storage tank 504. Preferably, the fluidic communication connection of the ozone generator 526 and the water storage tank 504 may be positioned at a portion of the water storage tank 504 that may be above the level of water that is carried by the water storage tank 504.

The system 500 may include an oxygen tank 528 and a regulator 530. The oxygen tank 528 may be carried by the housing 502, attached on an outside surface of the housing 502, or freely located external of the housing 502. The oxygen tank 528 may be in fluidic communication with the ozone generator 526 and/or the regulator 530. The oxygen tank 526 may be used to supply oxygen and/or any other composition used by the ozone generator 526 as understood by those skilled in the art. The regulator 530 may be in fluidic communication with the ozone generator 526 and/or the oxygen tank 528 and may be configured to regulate the fluidic matter that passes through the regulator 530.

The regulator 530 may comprise of a mechanical or an electrically operated regulator. The regulator 530 may be in communication with the system controller 534 and may be configured to be operable by the system controller 534. The regulator 530 may be configured to detect and/or monitor the pressure of fluidic medium flow from the oxygen tank 528 and/or to the ozone generator 526 and may be configured to send a regulator signal to the system controller 534. The system controller 534 may be operable to receive a signal from the regulator and may cause one or more predetermined actions to take place. For example, without limitation, the regulator 530 may send a signal to the system controller 534 to inform the system controller 534 of the pressure of fluidic medium flow from the oxygen tank 528 to the ozone generator 526, and the system controller 534, based on whether the pressure of the fluidic medium is low or high, may: activate, deactivate, and/or change the operation of the electronic components of the system 500; and/or send the information to the display unit 556. More information on the display unit 556 follows further below.

Continuing to reference FIG. 9, and additionally referring to FIG. 10, the sterilizer 522 may be carried by the water storage tank 504 and may preferably be attached to an upper inside surface of the water storage tank 504. The sterilizer may be in communication with the system controller 534.

The system 500 may include a plurality of sterilizers 522 carried by the water storage tank 504 or attached to the upper inside surface of the water storage tank 504, and in communication with the system controller 534. The sterilizer 522 may be used to disable, remove, eliminate, kill, clean, sterilize, and/or make-safe pathogens, bacteria, viruses, parasites, fungi, and/or any other contaminate which may be located in the water storage tank 504 and/or in the water carried by the water storage tank 504 that may be affected by a sterilizer 522 as understood by those skilled in the art. The sterilizer 522 may comprise an ionizing radiation sterilizer, dry-heat sterilizer, liquid chemical sterilizer, filtration sterilizer, microwave sterilizer, ozone sterilizer, infrared sterilizer, ultraviolet radiation sterilizer, and/or any other sterilization component that may be used as the sterilizer as understood by those skilled in the art.

Continuing to reference FIG. 9, and additionally referencing FIGS. 5-6, the water reservoir 542 may be carried by the housing 502 and may include one or more of an inlet, outlet, and two-way connection that may be used for fluidic communication. The inlet, outlet, and/or two-way connection of the water reservoir 542 may be in fluidic communication with the outlet of the water purifier 540, the outlet of the at least one water filter 538, the water source 506, and/or the inlet of the water storage tank 504. The water reservoir 542 may be configured to carry water that may eventually be placed into and carried by the water storage tank 504.

The water reservoir 542 may include a manual reservoir valve 562 that may include a first connection and a second connection. The first connection and/or second connection of the manual reservoir valve 562 may be in fluidic communication with the inlet, outlet, or two-way connection of the water reservoir 542, the outlet of the water purifier 540, and/or the inlet of the water storage tank valve 514. The manual reservoir valve 562 may be configured to be manually operable by a user to operate the manual reservoir valve 562 to move between and/or maintain the opened state and/or the closed state.

Now referring specifically to FIG. 9, the system 500 may include a multiple path line 564 that may comprise of a multiple connection tube, such as, without limitation, a tube in a T-shape or a Y-shape, such that the multiple path line 564 is capable of having two or more fluidic communication connections. The multiple path line 564 may include a first, second, and third end. The first end may be in fluidic communication with one or more of the water source, the outlet of the at least one water filter 538, and the outlet of the water purifier 540. The second end may be in fluidic communication with the first connection or second connection of the manual reservoir valve 562, and the third end may be in fluidic communication with the inlet of the water storage tank 504.

Now continuing to refer to FIG. 9, and additionally referring to FIG. 5, the blower 524 may include a blower outlet. The blower outlet of the blower 524 may be in fluidic communication with the water storage tank 504. Preferably, the blower outlet of the blower 524 may be in fluidic communication with the water storage tank 504 at an upper portion of the water storage tank 504 such that the fluidic connection is above the water carried by the water storage tank 504. The blower 524 may be configured to create pressure within the water storage tank by pushing ambient air into the water storage tank 504. The pressure may be utilized to move the ambient air, ozone, and/or dry mist from the water storage tank 504 and through the dispensing line 518. The volume of space within the water storage tank 504 that is between an upper inside surface of the water storage tank 504 and an upper surface of the water carried by the water storage tank 504 may be defined as a blending chamber, as mentioned above. The blending chamber may be the location where the ozone, dry mist, and/or ambient air mix together as a homogeneous and/or heterogeneous mixture of ozone infused dry mist 566 that may be expelled from the water storage tank 504 through the dispensing line 518 and to an environment, surface, and/or object that may be external to the housing 504, as illustratively shown in FIG. 8.

The blower 524 may be configured to have various modes of operation including, but not limited to, an activated mode and a deactivated mode. The activated mode may be defined as the blower 524 operating to create a fluidic pressure. The deactivated mode may be defined as the blower 524 not creating any fluidic pressure. The blower 524 may in communication with the system controller 534 and may be configured to be operable by the system controller 534. The system controller 534 may operate the blower 524 based on signals the system controller 534 receives from the electronic components of the system 500, and/or from the input member 554. Details on the input member 554 follows further below.

Now referring additionally to FIG. 7, the manual valve 510 may include an inlet and an outlet. The inlet of the manual valve 510 may be in fluidic communication with the water source 506. The outlet of the manual valve 510 may be in fluidic communication with the inlet of the at least one water filter 538, the inlet of the water purifier 540, the inlet, outlet, or two-way connection of the water reservoir 542, and/or the inlet of the water storage tank 504. The manual valve 510 may be configured to be manually operated by a user to operate the manual valve 510 to move between and/or maintain the opened state and/or the closed state.

The electronic valve 512 may include an inlet and an outlet. The inlet may be in fluidic communication with the water source 506, and/or the outlet of the manual valve 510. The outlet of the electronic valve 512 may be in fluidic communication with the inlet of the at least one water filter 538, the inlet of the water purifier 540, the inlet, outlet, or two-way connection of the water reservoir 542, and/or the inlet of the water storage tank 504.

Continuing to reference FIGS. 5 and 9, and additionally referencing FIGS. 6 and 10, the water storage tank valve 514 may include an inlet and an outlet. The outlet may be in fluidic communication with the inlet of the water storage tank 504. The inlet of the water storage tank valve 514 may be in fluidic communication with one or more of the water source 506, the outlet of the manual valve 510, the outlet of the electronic valve 512, the outlet of the at least one water filter 538, the outlet of the water purifier 540, the first or second connector of the manual reservoir valve 562, the first, second, or third end of the multiple path line 564, and/or the inlet, outlet, or two-way connector of the water reservoir 542.

The drain valve 516 may include an inlet and an outlet. The inlet may be in fluidic communication with the outlet of the water storage tank 504. The outlet of the drain valve 516 may be in fluidic communication with the waste drain 508. The outlet of the drain valve 516 may be in fluidic communication with the waste drain 508 via a drain line 552. Preferably, the drain valve 516 may be in fluidic communication with the water storage tank 504 at a lower portion of the water storage tank 504.

It is contemplated that water exiting the system via the waste drain 508 exits to a drain or waste line associated with a structure that the humidifying system 500 according to the present invention is positioned in. In instances where it is not possible to drain water from the humidifying system 500 to a waste line associated with a structure, the present invention contemplates that a waste water collection tank (not shown) may be included in the system to collect such waste water. It is also contemplated that such a tank would include a level and/or a pressure sensor (also not shown) to provide an indication of a level within the tank and/or a pressure within the tank and to further provide an indication of when then tank needed to be emptied.

The one or more shutoff valves may be positioned in fluidic communication with any of the members, components, or devices of the system 500 that may be fluidically connected. More specifically, both the first shutoff valve 536 and the second shutoff valve 548 may include an inlet and an outlet. Their inlets and/or outlets may be in fluidic communication with the water source 506, the outlet of the manual valve 510, the outlet of the electronic valve 512, the inlet or outlet of the at least one water filter 538, the inlet or outlet of the water purifier 540, the inlet, outlet, or two-way connector of the water reservoir 542, the inlet of the water storage tank valve 504, the inlet of the water storage tank 504, the inlet or outlet of the drain valve 516, the first, second, or third end of the multiple path line, and/or the waste drain 508.

The one or more shutoff valves may comprise of either mechanical valves or electrically power valves. Shutoff valves that comprise of mechanical valves may be configured to mechanically detect a water pressure and/or flow rate of water passing through the shutoff valve and move between and/or maintain a closed position when a water pressure and/or flow rate is mechanically detected above a predetermined high water pressure and/or flow rate, and then to move to or maintain the opened state when it is mechanically detected that the water pressure and/or flow rate has gone below the predetermined high water pressure and/or flow rate.

Shutoff valves that comprise of electrically powered valves may be configured to electronically detect a water pressure and/or flow rate of water passing through the shutoff valve and move between and/or maintain a closed position when a water pressure and/or flow rate is detected above a predetermined high water pressure and/or flow rate, and then to move to or maintain the opened state when it is detected that the water pressure and/or flow rate has gone below the predetermined high water pressure and/or flow rate.

Electronically powered shutoff valves may be in communication with the system controller 534 and the shutoff valves may be configured to be operable by the system controller 534. The shutoff valves may be configured to send a shutoff valve signal to the system controller 534, to which the system controller 534 may be configured to receive and cause a number of predetermined actions to take place in response to the shutoff valve signal.

For example, upon the system controller 534 receiving a shutoff valve signal from one or more of the shutoff valves that the water pressure and/or flow rate of water flowing through one or more of the shutoff valves is above a predetermined higher water pressure and/or flow rate, the system controller 534 may cause: one or more of the electronic components of the system 500 to activate and/or deactivate; change the operation of one or more of the electronic components of the system 500; cause one or more of the shutoff valves to move between and/or maintain the opened state and/or the closed state; and/or do nothing.

Another example, upon the system controller 534 receiving a shutoff valve signal from one or more of the shutoff valves that the water pressure and/or flow rate of water flowing through one or more of the shutoff valves is below a predetermined higher water pressure and/or flow rate, the system controller 534 may cause: one or more of the electronic components of the system 500 to activate and/or deactivate; change the operation of one or more of the electronic components of the system 500; cause one or more of the shutoff valves to move between and/or maintain the opened state and/or the closed state; and/or do nothing.

In another embodiment, the water pressure sensors 546 may be positioned in communication with the shutoff valves and/or the outlet of the water purifier 540 and may be configured to detect a water pressure in the shutoff valves and/or the outlet of the water purifier 540. More specifically, there may be a first water pressure sensor 546' in communication with the first shutoff valve 536, a second water pressure sensor 546" in communication with the second shutoff valve 548, and a third water pressure sensor 546''' in communication with the outlet of the water purifier 540, as illustratively shown in FIGS. 9 and 10. The water pressure sensors 546 may be configured to send a water pressure signal to the shutoff valves and/or the system controller 534. The shutoff valves and/or the system controller 534 may be configured to receive the water pressure signal and cause an action to take place in reaction to receiving the water pressure signal.

For example, without limitation, upon the water pressure sensors 546 sending a signal to the shutoff valves and/or the system controller 534 that the water pressure detected by the first, second, and/or third water pressure sensors (546', 546", and/or 546''') are above or below either a predetermined high water pressure level or are differentiating in pressure levels above or below a predetermined water pressure differentiation level, the shutoff valves and/or the system controller 534 may cause one or more of the shutoff valves to move between and/or maintain the opened state and/or the closed state, and the system controller 534 may cause: one or more of the electronic components of the system 500 to activate and/or deactivate; change the operation of one or more of the electronic components of the system 500; and/or do nothing.

In another embodiment, the water pressure sensor 546 may comprise of a fluidic line that may be in fluidic communication with at least one of the shutoff valves, outlet of the water purifier 540, and the multiple path line 564. The shutoff valves may be configured to detect and/or compare the water pressure of water passing through the shutoff valves and the outlet of the water purifier 540 and mechanically operate in reaction to the water pressures detected. For example, without limitation, upon the first shutoff valve 536 detecting that the water pressure of the water flowing through it is above or below the water pressure in the water pressure sensor 546 that comprises of a fluidic line, the first water pressure sensor 536 may move between and/or maintain the opened state and/or the closed state. The second shutoff valve 548 may be configured to similarly operate.

Preferably, a water pressure sensor 546 that comprises of a fluidic line is in fluidic communication to the outlet of the water purifier 540 or the multiple path line 564, but also in fluidic communication with the first shutoff valve 536 and the second shutoff valve 548 in a configuration so that the fluidic communication does not allow water to flow from the outlet of the water purifier 540 or the multiple path line 564 and out from the shutoff valves. Instead the water pressure from the water pressure sensor 546 that comprises of a fluidic line is only used to operate the hydraulic and/or mechanical operations of the shutoff valves in order to move the shutoff valves between and/or in maintenance of the opened state and/or the closed state.

No referring to FIGS. 5-6 and 9, the plurality of water level sensors 532 may be positioned on an inside and/or outside surface of the water storage tank 504 and in communication with the system controller 534. More than one water level sensor 532 may be implemented, such as in a row configuration. The water level sensors 532 may be configured to detect a level of water of the water carried by the water storage tank 504 and may be configured to send a water level signal to the system controller 534. Upon the system controller 534 receiving a water level signal from the water level sensors 534, a predetermined water level signal action may take place.

For example, without limitation, if a signal is that the water level is at a predetermined lower water level, which may be defined as a range between 0%-25% of a predetermined water capacity of the water storage tank 504, the system controller 534 may: cause water to flow into the water storage tank 504; stop water from flowing out of the water storage tank 504; and/or take no action.

Furthermore, the system controller 534 may be configured to detect an issue by detecting that the water level sensors 532 have detected no change in the water level, or no increase in the water level of the water carried by the water storage tank after the system controller 534 has caused water to flow into the water storage tank 504 and after a predetermined amount of time has passed. Upon detecting this, the system controller 534 may then cause: one or more of the electronic components of the system 500 to activate and/or deactivate; stop flowing water into the water storage tank; and/or do nothing.

Another example, without limitation, if the system controller 534 receives a signal that the water level in the water storage tank 504 is at a predetermined upper water level, which may be defined as a range between 75%-100% of the predetermined water capacity of the water storage tank 504, the system controller 534 may: cause the water in the water storage tank 504 to drain out from the water storage tank 504; cause water to flow into the water storage tank 504; stop water from flowing into the water storage tank 504; and/or take no action.

The system controller 534 may drain the water from the water storage tank 504 by operating the drain valve 516 to become and/or maintain the opened state, and the system controller 534 may cause water to flow into the water storage tank 504 by operating the water storage tank valve 514 to move between and/or maintain the opened state and/or closed state. The system controller 534 may cause water to stop flowing out of the water storage tank 534 by operating the drain valve 516 to become and/or maintain the closed state, and the system controller 534 may cause water to stop flowing into the water storage tank 504 by operating the water storage tank valve 514 to move between or maintain the opened state and/or closed state.

The water quality sensor 520 may be carried by the water storage tank 504. Preferably, the water quality sensor 520 is positioned at a lower level inside the water storage tank 504 so that the water quality sensor 520 may be submerged by the water carried by the water storage tank 504. The water quality sensor 520 may be configured to detect a water quality level of the water carried by the water storage tank 504 and may be configured to send a water quality signal to the system controller 534. The water quality sensor 520 may be configured to detect the quality of the water carried by the water storage tank 504 by detecting level of one or more of pH, chloride, salinity, dissolved oxygen, turbidity, nitrate, phosphate, redox, electrical conductivity, and presence of metals and/or chemical compounds.

Upon the system controller 534 receiving a water quality signal, the system controller 534 may cause a predetermined action to take place in response to the water quality signal. For example, without limitation, if the system controller 534 receives a signal that the water quality level is below a predetermined lower water quality level, then the system controller 534 may cause one or more of: drain the water carried by the water storage tank 504 by operating the drain valve 516; cause water to flow into the water storage tank 504 by operating the water storage tank valve 514; activate and/or deactivate one or more of the electronic components of the system 500; change the operation of one or more of the electronic components of the system 500; and/or do nothing.

The at least one humidity sensor 550 may be attached to an outside surface of the housing 502 or the at least one humidity sensor 550 may be carried by the housing 502 and extend outside of the housing 502. The humidity sensor 550 may be in communication with the system controller 550 and may be configured to detect a humidity level of an environment outside of the housing 502 and send a humidity level signal to the system controller 534. The system controller 534 may be configured to be operable to receive the humidity level signal and cause a predetermined action to take place in response to receiving the humidity level signal.

For example, without limitation, upon the system controller 534 receiving a signal that the humidity level is above a predetermined higher humidity level, the system controller 534 may cause one or more of: the electronic components of the system 500 to activate and/or deactivate; the electronic components of the system 500 to increase or decrease the production of dry mist and/or ozone; the electronic components of the system 500 to start or stop generating dry mist and/or ozone; and/or do nothing.

Another example, without limitation, upon the system controller 534 receiving a signal that the humidity level is below a predetermined lower humidity level, the system controller 534 may cause one or more of: the electronic components of the system 500 to activate and/or deactivate; the electronic components of the system 500 to increase or decrease the production of dry mist and/or ozone; the electronic components of the system 500 to start or stop generating dry mist and/or ozone; and/or do nothing.

Another example, without limitation, upon the system controller receiving 534 receiving a signal that the humidity level is not at a predetermined selected humidity level, the system controller may cause one or more of: the electronic components of the system 500 to activate and/or deactivate; the electronic components of the system 500 to increase or decrease the production of dry mist and/or ozone; the electronic components of the system 500 to start or stop generating dry mist and/or ozone; and/or do nothing. The predetermined selected humidity level may be at humidity level selected by a user for the system 500 to automatically maintain. The user may select this by operating the input member 554 and/or the display unit 556, which are covered in more detail further below.

Figure 8:
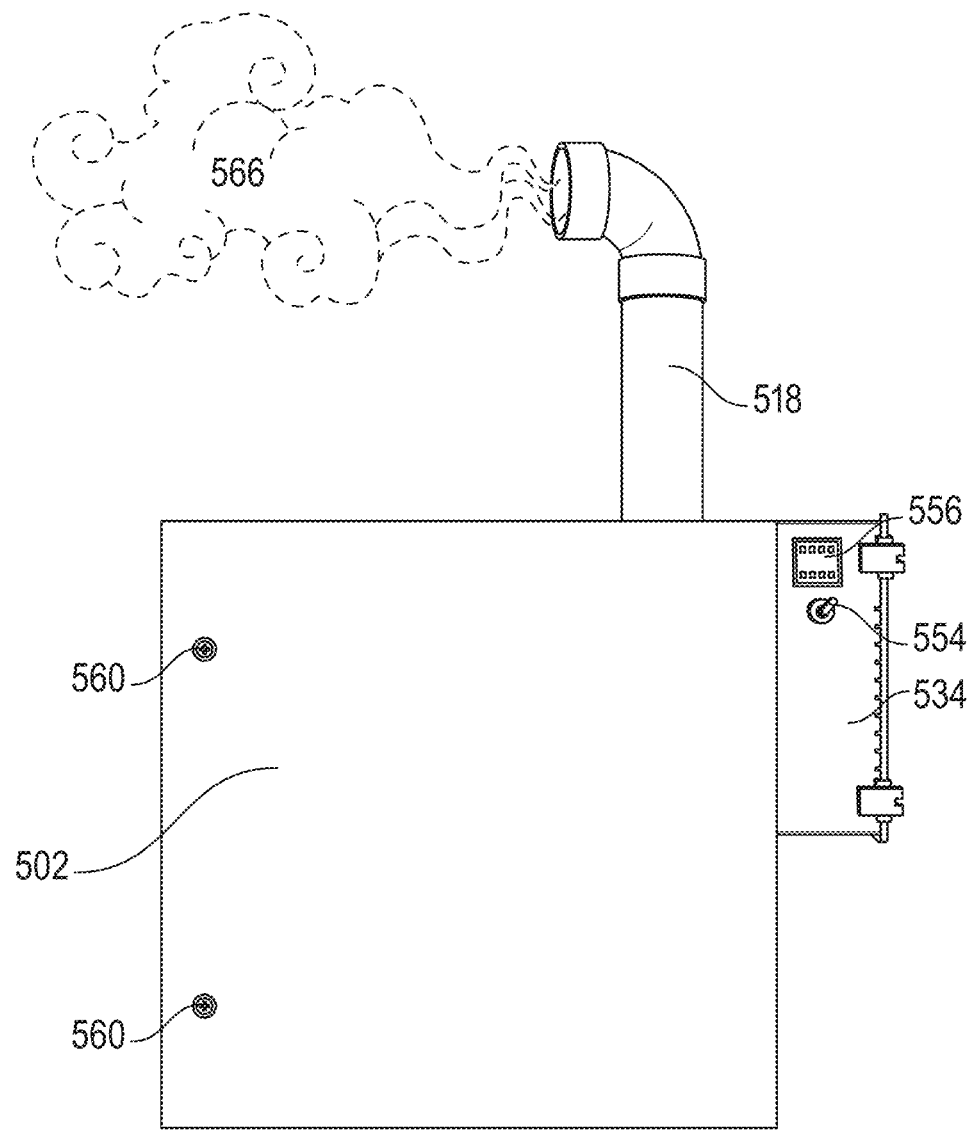
FIG. 8 is a perspective view of the humidifying system in FIG. 7 in operation.

Now referring to FIGS. 5 and 8, the input member 554 may be attached to an outside surface of the housing 502, or to an outside surface of the system controller 534. The input member 554 may comprise of a switch, wheel, rotatable knob, keypad, one or more buttons, and/or a touchscreen display. The input member 554 may be in communication with the system controller 534 and may be configured to be operable by a user to control various operations of the system 500. For example, the input member 554 may be configured to allow a user to enter inputs and send an input signal to the system controller 534. The system controller 534 may be configured to receive the input signals from the input member 554 and cause certain actions to take place in the system 500, such as, the system controller 534 may receive an input signal from the input member 554 that the user wants to activate, deactivate, and/or operate the system 500 in various modes of operation. The various modes may comprise of, high production of ozone and dry mist, low production of ozone and dry mist, autonomous operation to maintain a user imputed humidity level (also referred to as the predetermined selected humidity level), no ozone production, and/or no dry mist production. The system controller 534 may run the system 500 as determined by the user inputs in the input member 554 by operating the electronic components of the system 500 to activate, deactivate, and/or operate at predetermined operation levels to conform with the mode of operation selected by a user.

The display unit 556 may be attached to an outside surface of the housing 504, or an outside surface of the system controller 534. The display unit 556 may comprise of a digital display. The display unit 556 may be in communication with the system controller 534. The display unit 556 may be configured to display information on the current operation of the system 500. The display unit 556 may include buttons, switches, and other input components that a user may use to change and/or cycle through what information the display unit 556 displays to the user. For example, water levels of the water carried by the water storage tank 504, humidity levels detected by the humidity sensor 550, water quality levels detected by the water quality sensor 520, current mode of operation, and/or error codes.

The foregoing is considered as illustrative only of the principles of the invention. Numerous changes and modifications will readily occur to those skilled in the art, as it is not desired to limit the invention to the exact construction and operation shown and described, and accordingly, all such suitable changes or modifications in structure and operation which may be resorted to are intended to fall within the scope of the claimed invention.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The invention claimed is:

1. A humidifying system comprising:
   a housing;
   at least two water filters carried by the housing and in fluid communication with a water source, wherein the at least two water filters comprise at least one of a series of water filters in fluid communication with one another in series having a final water filter and a first water filter that is in fluid communication with the water source, and a parallel configuration of water filters defined as parallel water filters that are each in fluid communication with the water source;
   a water purifier carried by the housing and in fluid communication with at least one of the final water filter and each of the parallel water filters;
   a water storage tank carried by the housing and in fluid communication with the water purifier;
   at least one water level sensor configured to sense a water level within the water storage tank;
   a water quality sensor configured to sense a quality of water within the water storage tank;
   a dry mist generator to generate a dry mist using water from the water storage tank;
   an ozone generator to generate ozone to be mixed with the dry mist to define an ozone infused dry mist;
   a system controller carried by the housing and in communication with the at least one water level sensor, the water quality sensor, the dry mist generator and the ozone generator;
   a water reservoir carried by the housing and in fluid communication with both of the water purifier and the water storage tank via a manual reservoir valve;
   a blower in communication with the system controller, mounted on an upper portion of the water storage tank and including a blower outlet in fluid communication with the water storage tank; and
   at least one sterilizer attached to an upper interior surface of the water storage tank, in communication with the system controller and operable to sterilize the water within the water storage tank;
   wherein when and while the blower is in an activated mode, the blower creates an air pressure in the water storage tank to expel the ozone infused dry mist is from the housing to an environment external to the housing;
   wherein the system controller is operable to receive a signal from the water quality sensor;
   wherein upon receiving a signal from the water quality sensor that the quality of the water within the storage tank is below a predetermined quality level, the system controller causes the water within the storage tank to be drained; and
   wherein the manual reservoir valve is manually operable to allow water to flow into and out from the water reservoir.

2. The humidifying system of claim 1, further comprising at least one of a manual valve and an electronic valve in fluid communication with the water source and at least one of the first water filter and each of the parallel water filters.

3. The humidifying system of claim 2, further comprising a water storage tank valve in fluid communication with the water purifier and the water reservoir, and in communication with the system controller.

4. The humidifying system of claim 3, wherein the system controller is operable to receive a signal from the at least one water level sensor; wherein upon the system controller receiving a signal from the at least one water level sensor that the water level within the water storage tank is below a predetermined lower level, the system controller causes water to flow into the water storage tank; and wherein upon the system controller receiving a signal from the at least one water level sensor that the water level within the water storage tank is at a predetermined upper level, the system controller causes water to stop flowing into the water storage tank.

5. The humidifying system of claim 1, wherein the water storage tank comprises a dispensing line that extends to a position external to the housing; and wherein the ozone infused dry mist is expelled from the housing to the environment external to the housing via the dispensing line.

6. The humidifying system of claim 1, wherein the system controller is operable to receive a signal from the dry mist generator; and wherein the system controller is configured to activate and deactivate the humidifying system based on a signal received from the dry mist generator.

7. The humidifying system of claim 6, wherein the system controller is operable to receive a signal from the ozone generator; and wherein the system controller is configured to activate and deactivate the humidifying system based on a signal received from the ozone generator.

8. The humidifying system of claim 7, further comprising:
   at least one humidity sensor in communication with the system controller and configured to detect a humidity level of an environment external to the housing;
   wherein the system controller is operable to receive a signal from the humidity sensor;
   wherein the system controller is configured to activate and deactivate the humidifying system based on a signal received from the at least one humidity sensor;
   wherein upon the system controller receiving a signal from the humidity sensor that the humidity level is above a predetermined humidity level, the system controller causes the humidifying system to at least one of decrease production of the dry mist and ozone, and stop production of the dry mist and ozone; and
   wherein upon the system controller receiving a signal from the at least one humidity sensor that the humidity level is below the predetermined humidity level, the system controller causes the humidifying system to increase the production of the dry mist and ozone.

9. The humidifying system of claim 1, further comprising a plurality of water pressure sensors in communication with the system controller, and a respective plurality of shutoff valves; and wherein upon detection of a water pressure above a predetermined water pressure level, the system controller is configured to send a water flow cutoff signal to at least one of the shutoff valves.

10. The humidifying system of claim 1, wherein the at least one sterilizer comprises at least one of an ionizing radiation sterilizer, a dry-heat sterilizer, a liquid chemical sterilizer, a microwave sterilizer, an ozone sterilizer, and an infrared sterilizer.

11. A humidifying system comprising:
    a housing;
    at least two water filters carried by the housing and in fluid communication with a water source, wherein the at least two water filters comprise at least one of a series of water filters in fluid communication with one another in series having a final water filter and a first water filter that is in fluid communication with the water source, and a parallel configuration of water filters defined as parallel water filters that are each in fluid communication with the water source;
a water purifier carried by the housing and in fluid communication with at least one of the final water filter and each of the parallel water filters;
a water storage tank carried by the housing and in fluid communication with the water purifier;
a water reservoir carried by the housing and in fluid communication with both of the water purifier and the water storage tank via a manual reservoir valve;
a blower in communication with a system controller, mounted on an upper portion of the water storage tank and including a blower outlet in fluid communication with the water storage tank;
a sterilizer attached to an upper interior surface of the water storage tank in communication with the system controller, and positioned to be in communication with and to sterilize water carried by the water storage tank;
a dispensing line that extends to a position external to the housing;
a dry mist generator to generate a dry mist using water from the water storage tank; and
an ozone generator to generate ozone to be mixed with the dry mist to define an ozone infused dry mist;
wherein the system controller is carried by the housing and in communication with at least one of the sterilizer, the dry mist generator, and the ozone generator;
wherein when and while the blower is in an activated mode, the blower creates an air pressure in the water storage tank to expel the ozone infused dry mist from the housing to an environment external to the housing via the dispensing line; and
wherein the manual reservoir valve is manually operable to allow water to flow into and out from the water reservoir.

12. The humidifying system of claim 11, further comprising a plurality of sensors in communication with the system controller; wherein the system controller is operable to receive a signal from at least one of the plurality of sensors; and wherein the system controller operates the system to take a predetermined action upon receiving a signal from at least one of the plurality of sensors.

13. The humidifying system of claim 12, wherein one of the plurality of sensors is a water level sensor configured to sense a water level within the water storage tank; wherein upon the system controller receiving a signal from the water level sensor that the water level within the water storage tank is below a predetermined lower level, the system controller causes water to flow into the water storage tank; and wherein upon the system controller receiving a signal from the water level sensor that the water level within the water storage tank is at a predetermined upper level, the system controller causes water to stop flowing into the water storage tank.

14. The humidifying system of claim 12, wherein one of the plurality of sensors is a water quality sensor configured to sense a quality of water within the water storage tank; and wherein upon the system controller receiving a signal from the water quality sensor that the quality of the water within the storage tank is below a predetermined quality level, the system controller causes the water within the storage tank to be drained.

15. The humidifying system of claim 12, wherein at least one of the plurality of sensors is a humidity sensor configured to detect a humidity level of an environment external to the housing; wherein upon the system controller receiving a signal from the humidity sensor that the humidity level is above a predetermined humidity level, the system controller causes the humidifying system to at least one of decrease production of the dry mist and ozone, and stop production of the dry mist and ozone; and wherein upon the system controller receiving a signal from the at least one humidity sensor that the humidity level is below the predetermined humidity level, the system controller causes the humidifying system to increase the production of the dry mist and ozone.

16. The humidifying system of claim 11, further comprising at least one of a manual valve and an electronic valve in fluid communication with the water source and at least one of the first water filter and each of the parallel water filters.

17. The humidifying system of claim 11, wherein the system controller is operable to receive a signal from at least one of the dry mist generator and the ozone generator; and wherein the system controller is configured to activate and deactivate the humidifying system based on a signal received from at least one of the dry mist generator and the ozone generator.

18. The humidifying system of claim 11, further comprising a plurality of shutoff valves; wherein at least one of the plurality of sensors is a water pressure sensor wherein upon the water pressure sensor detecting a water pressure above a predetermined water pressure level, the system controller is configured to send a water flow cutoff signal to at least one of the shutoff valves.

19. The humidifying system of claim 11, wherein the at least one sterilizer comprises at least one of an ionizing radiation sterilizer, a dry-heat sterilizer, a liquid chemical sterilizer, a microwave sterilizer, an ozone sterilizer, and an infrared sterilizer.

20. A humidifying system comprising:

a housing;

at least two water filters carried by the housing and in fluid communication with a water source, wherein the at least two water filters comprise at least one of a series of water filters in fluid communication with one another in series having a final water filter and a first water filter that is in fluid communication with the water source, and a parallel configuration of water filters defined as parallel water filters that are each in communication with the water source;

a water purifier carried by the housing and in fluid communication with the at least one of the final water filter and each of the parallel water filters;

a water storage tank carried by the housing and in fluid communication with the water purifier;

at least one water level sensor configured to sense a water level within the water storage tank;

a water quality sensor configured to sense a quality of water within the water storage tank;

a dry mist generator to generate a dry mist using water from the water storage tank;

a system controller carried by the housing and in communication with the at least one water level sensor, the water quality sensor, and the dry mist generator;

a water reservoir carried by the housing and in fluid communication with both of the water purifier and the water storage tank via a manual reservoir valve;

a blower in communication with the system controller, mounted on an upper portion of the water storage tank and including a blower outlet in fluid communication with the water storage tank; and at least one sterilizer attached to an upper interior surface of the water storage tank, in communication with the system controller and operable to sterilize the water within the water storage tank;

wherein when and while the blower is in an activated mode, the blower creates an air pressure in the water storage tank to expel the dry mist from the housing to an environment external to the housing;

wherein the system controller is operable to receive a signal from the water quality sensor;

wherein upon receiving a signal from the water quality sensor that the quality of the water within the storage tank is below a predetermined quality level, the system controller causes the water within the storage tank to be drained; and wherein the manual reservoir valve is manually operable to allow water to flow into and out from the water reservoir.

21. The humidifying system of claim 20, further comprising at least one of a manual valve and an electronic valve in fluid communication with the water source and at least one of the first water filter and each of the parallel water filters.

22. The humidifying system of claim 20, further comprising an ozone generator in communication with the system controller, positioned within the water storage tank and configured to generate ozone to be mixed with the dry mist to define an ozone infused dry mist; wherein when and while the blower is in an activated mode, the ozone infused dry mist is expelled from the housing to the environment external to the housing.

23. The humidifying system of claim 22, wherein the system controller is operable to receive a signal from the ozone generator; and wherein the system controller is configured to activate and deactivate the humidifying system based on a signal received from the ozone generator.

24. The humidifying system of claim 20, further comprising a water storage tank valve in fluid communication with the water purifier and the water reservoir, and in communication with the system controller.

25. The humidifying system of claim 24, wherein the system controller is operable to receive a signal from the at least one water level sensor; wherein upon the system controller receiving a signal from the at least one water level sensor that the water level within the water storage tank is below a predetermined lower level, the system controller causes water to flow into the water storage tank; and wherein upon the system controller receiving a signal from the at least one water level sensor that the water level within the water storage tank is at a predetermined upper level, the system controller causes water to stop flowing into the water storage tank.

26. The humidifying system of claim 20, wherein the water storage tank comprises a dispensing line that extends to a position external to the housing; and wherein the dry mist is expelled from the housing to the environment external to the housing via the dispensing line.

27. The humidifying system of claim 20, wherein the system controller is operable to receive a signal from the dry mist generator; and wherein the system controller is configured to activate and deactivate the humidifying system based on a signal received from the dry mist generator.

28. The humidifying system of claim 20, further comprising:

at least one humidity sensor in communication with the system controller, mounted on the housing and configured to detect a humidity level of the environment external to the housing;

wherein the system controller is operable to receive a signal from the humidity sensor;

wherein the system controller is configured to activate and deactivate the humidifying system based on a signal received from the at least one humidity sensor;

wherein upon the system controller receiving a signal from the humidity sensor that the humidity level is above a predetermined humidity level, the system controller causes the humidifying system to at least one of decrease production of the dry mist, and stop production of the dry mist; and wherein upon the system controller receiving a signal from the at least one humidity sensor that the humidity level is below the predetermined humidity level, the system controller causes the humidifying system to increase the production of the dry mist.

29. The humidifying system of claim 20, further comprising a plurality of water pressure sensors in communication with the system controller, and a respective plurality of shutoff valves; wherein upon detection of a water pressure above a predetermined water pressure level, the system controller is configured to send a water flow cutoff signal to at least one of the shutoff valves.

30. The humidifying system of claim 20, wherein the at least one sterilizer comprises at least one of an ionizing radiation sterilizer, a dry-heat sterilizer, a liquid chemical sterilizer, a microwave sterilizer, an ozone sterilizer, and an infrared sterilizer.

* * * * *